(12) United States Patent
Fan et al.

(10) Patent No.: US 12,317,100 B2
(45) Date of Patent: May 27, 2025

(54) COMMUNICATION METHOD, APPARATUS, AND SYSTEM

(71) Applicant: Huawei Technologies Co., Ltd., Shenzhen (CN)

(72) Inventors: Qiang Fan, Shanghai (CN); Chong Lou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 417 days.

(21) Appl. No.: 17/657,046

(22) Filed: Mar. 29, 2022

(65) Prior Publication Data

US 2022/0217549 A1    Jul. 7, 2022

Related U.S. Application Data

(63) Continuation of application No. PCT/CN2019/109755, filed on Sep. 30, 2019.

(51) Int. Cl.
*H04W 24/02*    (2009.01)
*H04W 76/15*    (2018.01)

(52) U.S. Cl.
CPC .......... *H04W 24/02* (2013.01); *H04W 76/15* (2018.02)

(58) Field of Classification Search
CPC .............................. H04W 24/02; H04W 76/15
USPC ......................................................... 370/328
See application file for complete search history.

(56) References Cited

U.S. PATENT DOCUMENTS

| | | | |
|---|---|---|---|
| 10,571,414 B2 * | 2/2020 | Turner | F24F 11/46 |
| 10,812,629 B2 * | 10/2020 | Park | H04W 76/27 |
| 10,841,929 B2 * | 11/2020 | Basu Mallick | H04W 48/16 |
| 10,925,117 B2 * | 2/2021 | Jiang | H04W 24/10 |
| 11,006,316 B2 * | 5/2021 | Qiao | H04L 69/04 |
| 11,089,512 B2 * | 8/2021 | Kwok | H04W 76/15 |
| 11,089,601 B2 * | 8/2021 | Byun | H04J 11/0053 |
| 11,096,241 B2 * | 8/2021 | Shah | H04L 1/1861 |
| 11,109,252 B2 * | 8/2021 | Kim | H04L 41/0816 |
| 11,109,397 B2 * | 8/2021 | Zhou | H04W 72/23 |
| 11,122,643 B2 * | 9/2021 | Zhu | H04W 76/22 |
| 11,153,272 B2 * | 10/2021 | Yang | H04L 61/2592 |
| 11,172,398 B2 * | 11/2021 | You | H04W 8/00 |
| 11,178,526 B2 * | 11/2021 | Yang | H04W 4/40 |
| 11,228,902 B2 * | 1/2022 | Wang | H04W 80/08 |

(Continued)

FOREIGN PATENT DOCUMENTS

| | | |
|---|---|---|
| CN | 104519583 A | 4/2015 |
| CN | 104936291 A | 9/2015 |

(Continued)

OTHER PUBLICATIONS

Ericsson, "EHC solution", 3GPP TSG-RAN WG2 #107, R2-1909371, Prague, Czech Republic, Aug. 26-30, 2019, 6 pages.

(Continued)

*Primary Examiner* — Melvin H Pollack
(74) *Attorney, Agent, or Firm* — Slater Matsil, LLP

(57) ABSTRACT

A first access network device allocates, to a second access network device based on an obtained quantity, supported by a terminal, of data radio bearers (DRBs) to which a data frame compression function is applied, a quantity of DRBs the second access network device can configure for the terminal and to which the function is applied can configure, and notifies the second access network device of an allocation result.

20 Claims, 9 Drawing Sheets

(56) References Cited

U.S. PATENT DOCUMENTS

| | | | |
|---|---|---|---|
| 11,229,073 B2* | 1/2022 | Yang | H04W 76/14 |
| 11,234,152 B2* | 1/2022 | Tsuboi | H04W 76/27 |
| 11,277,773 B2* | 3/2022 | Liu | H04W 36/18 |
| 11,300,936 B2* | 4/2022 | Ganesan | G05B 19/042 |
| 11,310,707 B2* | 4/2022 | Liu | H04W 28/0263 |
| 11,330,489 B2* | 5/2022 | Prasad | H04W 16/04 |
| 11,330,657 B2* | 5/2022 | Futaki | H04W 8/22 |
| 11,375,527 B1* | 6/2022 | Eyuboglu | H04B 7/15528 |
| 11,375,563 B2* | 6/2022 | Hori | H04W 76/11 |
| 11,388,755 B2* | 7/2022 | Cirik | H04W 24/08 |
| 11,395,365 B2* | 7/2022 | Ingale | H04W 12/037 |
| 11,399,400 B2* | 7/2022 | Hori | H04W 76/10 |
| 11,419,066 B2* | 8/2022 | Jeon | H04W 72/0466 |
| 11,452,026 B2* | 9/2022 | Liu | H04W 24/10 |
| 11,490,295 B2* | 11/2022 | Schmidt | H04W 36/362 |
| 11,540,250 B2* | 12/2022 | Hwang | H04W 72/23 |
| 11,546,815 B2* | 1/2023 | Pelletier | H04W 76/30 |
| 11,553,551 B2* | 1/2023 | Jung | H04W 76/15 |
| 11,569,954 B2* | 1/2023 | Zhang | H04L 5/0051 |
| 11,570,614 B2* | 1/2023 | Yang | H04W 24/02 |
| 11,595,839 B2* | 2/2023 | Kim | H04L 5/0023 |
| 11,601,845 B2* | 3/2023 | Wirth | H04L 1/1812 |
| 11,612,004 B2* | 3/2023 | Kawasaki | H04W 60/00 |
| 11,632,676 B2* | 4/2023 | Lee | H04W 76/12 726/4 |
| 11,672,035 B2* | 6/2023 | Jung | H04W 4/40 370/235 |
| 11,700,649 B2* | 7/2023 | Kim | H04W 8/205 370/328 |
| 11,729,846 B2* | 8/2023 | Liu | H04W 76/15 370/329 |
| 11,758,422 B2* | 9/2023 | Xiao | H04W 76/19 370/243 |
| 11,848,779 B2* | 12/2023 | Hong | H04W 28/0263 |
| 11,864,181 B2* | 1/2024 | Hong | H04L 5/0058 |
| 11,889,349 B2* | 1/2024 | Dudda | H04L 45/66 |
| 11,895,582 B2* | 2/2024 | Zhou | H04L 5/0032 |
| 11,910,464 B2* | 2/2024 | Hori | H04W 76/22 |
| 11,937,304 B2* | 3/2024 | Hwang | H04W 24/10 |
| 11,937,319 B2* | 3/2024 | Chen | H04W 12/72 |
| 11,950,287 B2* | 4/2024 | Zhou | H04W 76/27 |
| 11,974,254 B2* | 4/2024 | Lee | H04W 72/02 |
| 12,003,444 B2* | 6/2024 | Zhu | H04L 5/0073 |
| 2019/0124181 A1 | 4/2019 | Park et al. | |
| 2019/0149993 A1 | 5/2019 | Tenny | |
| 2020/0107221 A1* | 4/2020 | Prakash | H04L 69/22 |
| 2020/0154499 A1 | 5/2020 | Futaki | |
| 2020/0259896 A1* | 8/2020 | Sachs | H04W 56/0065 |
| 2021/0144588 A1* | 5/2021 | Tang | H04W 76/27 |
| 2021/0210202 A1* | 7/2021 | Awiszus | G05B 19/0428 |
| 2022/0264405 A1* | 8/2022 | Hong | H04W 36/14 |

FOREIGN PATENT DOCUMENTS

| | | | |
|---|---|---|---|
| JP | 2020536406 A | * | 12/2020 |
| KR | 20110058907 A | | 6/2011 |
| KR | 20130008642 A | | 1/2013 |
| WO | 2018230027 A1 | | 12/2018 |
| WO | WO-2020062176 A1 | * | 4/2020 |

OTHER PUBLICATIONS

Huawei et al., "DRB ID allocation for Option 4 and Option 7", 3GPP TSG-RAN WG2 Meeting #101, R2-1802521, Athens, Greece, Feb. 26-Mar. 2, 2018, 2 pages.

3GPP TS 38.331 V15.7.0 (Sep. 2019), 3rd Generation Partnership Project; Technical Specification Group Radio Access Network; NR; Radio Resource Control (RRC) protocol specification(Release 15), 527 pages.

3GPP TS 38.306 V15.7.0 (Sep. 2019), 3rd Generation Partnership Project; Technical Specification Group Radio Access Network; NR; User Equipment (UE) radio access capabilities(Release 15), 55 pages.

3GPP TS 38.423 V15.4.0 (Jul. 2019), 3rd Generation Partnership Project; Technical Specification Group Radio Access Network; NG-RAN; Xn application protocol (XnAP) (Release 15), 309 pages.

* cited by examiner

COMMUNICATION METHOD, APPARATUS, AND SYSTEM

CROSS-REFERENCE TO RELATED APPLICATIONS

This application is a continuation of International Application No. PCT/CN2019/109755, filed on Sep. 30, 2019. The afore-mentioned patent applications are hereby incorporated by reference in their entirety.

TECHNICAL FIELD

The present invention relates to wireless communication technologies, and in particular, to a communication method, an apparatus, and a system.

BACKGROUND

In a communication system, a bandwidth resource and coverage of a single access network device are limited. A multi-connection mode for providing a service for a terminal device by using radio resources of a plurality of access network devices can increase a data throughput of the terminal device, improve communication performance of the terminal device, and increase radio resource utilization.

In a multi-connection scenario in which one terminal device communicates with a plurality of access network devices, one of the access network devices is a master access network device, where the master access network device exchanges control plane signaling with the terminal device, and another access network device that communicates with the terminal device may be referred to as a secondary access network device. A scenario in which one terminal device simultaneously establishes connections to two access network devices, and sends and receives data by using the two connections may be referred to as a dual connectivity (DC) scenario. Similar to a single-connection scenario, in the multi-connection scenario, a data frame compression function, an Ethernet header compression (EHC) function, and a packet data convergence protocol (PDCP) replication function may also be used.

In the data frame compression function, a first-in first-out compression buffer is maintained on a compression side, and a data packet is compressed by using content of the buffer and a compression algorithm, and sent. In addition, the data packet is pushed to the compression buffer. In the data frame compression function, a first-in first-out decompression buffer is maintained on a decompression side. When the compressed data packet is received, the data packet is decompressed by using the content of the buffer and a decompression algorithm. After the data packet is decompressed, the data packet is pushed to the decompression buffer. In the foregoing process, a sequence of decompressing data packets needs to be exactly the same as a sequence of sending the data packets on the compression side. The data frame compression function includes an uplink data compression (UDC) function.

The EHC function may be used in an industrial control scenario. A 5G system may be used as the last hop of an industrial control network. For example, Ethernet data may be transmitted between a console and a control node through the 5G system. To improve radio resource utilization efficiency, a fixed field in an Ethernet header of an Ethernet data stream may be compressed, for example, a source/destination Ethernet address field of a console and a control node connected to a terminal device. This technology may be referred to as an EHC technology.

The PDCP replication function may also be referred to as a duplication transmission function of a PDCP layer. In the PDCP replication function, a data packet of a radio bearer may be duplicated at a PDCP layer, to obtain a plurality of identical data packets (namely, duplicate packets), and then the plurality of identical data packets are separately delivered to a plurality of different radio link control (RLC) layer entities, to transmit the data packets to a media access control (MAC) layer by using different logical channels. The logical channel is a channel between an RLC layer and the MAC layer.

However, in the multi-connection scenario, when the data frame compression function, the Ethernet header compression function, or the PDCP replication function is used, a communication failure may be caused.

SUMMARY

Embodiments of the present invention provide a communication method, an apparatus, and a system, to reduce a failure probability of a communication function. The method, the apparatus, and the system are applicable to a multi-connection scenario.

According to a first aspect, an embodiment of this application provides a communication method. The method includes: A first access network device obtains first information of a terminal, where the first information is used to indicate a first quantity, the first quantity is a quantity of first function objects supported by the terminal, the first function object is a data radio bearer DRB to which a first function is applied or a context maintained for the first function, and the first function is a data frame compression function, a packet data convergence protocol PDCP replication function, or an Ethernet header compression EHC operation function; the first access network device determines a second quantity based on the first information, where the second quantity is a quantity of first function objects that a second access network device can configure for the terminal, and the second quantity is less than or equal to the first quantity; and the first access network device sends second information to the second access network device, where the second information is used to indicate the second quantity.

The quantity of DRBs to which the first function is applied and the quantity of contexts maintained for the first function each are a quantity of resources corresponding to the first function.

According to the method in the first aspect, the first access network device allocates the second quantity to the second access network device, so that the quantity of DRBs that the first access network device and the second access network device configure for the terminal and to which the first function is applied or the quantity of contexts maintained for the first function does not exceed a capability restriction of the terminal. This avoids a case in which the terminal incorrectly parses a data packet or congestion occurs because a data packet waits to be processed.

In another description manner of the communication method according to the first aspect, the method includes: A first access network device obtains first information of a terminal, where the first information is used to indicate a first quantity, the first quantity is a quantity of data radio bearers DRBs that are supported by the terminal and to which a first function is applied, or the first quantity is a quantity of contexts that are supported by the terminal and that are maintained for the first function, and the first function is a data frame compression function, a packet data convergence protocol PDCP replication function, or an Ethernet header compression EHC operation function; the first access network device determines a second quantity based on the first information, where the second quantity is a quantity of DRBs that a second access network device can configure for the terminal and to which the first function is applied, or the second quantity is a quantity of contexts that the second access network device can configure for the terminal and that are maintained for the first function, and the second quantity is less than or equal to the first quantity; and the first access network device sends second information to the second access network device, where the second information is used to indicate the second quantity.

In an optional design, the data frame compression function is an uplink data compression UDC function.

In an optional design, the quantity of first function objects supported by the terminal is a maximum quantity of first function objects supported by the terminal.

In an optional design, the quantity of first function objects that the second access network device can configure for the terminal is: a maximum quantity of first function objects that the second access network device can configure for the terminal; or a quantity of first function objects to be configured by the second access network device for the terminal.

In an optional design, the first access network device sends the first information to the second access network device. In this process, the second access network device can negotiate with the first access network device and adjust, without exceeding the first quantity, the second quantity determined by the first access network device. This improves a negotiation success probability and improves negotiation efficiency.

In an optional design, the first access network device receives third information from the second access network device, where the third information is used to indicate a third quantity, the third quantity is a quantity of first function objects expected to be configured by the second access network device for the terminal, and the third quantity is less than or equal to the first quantity. Based on the third quantity expected by the second access network device, a fourth quantity allocated by the first access network device to the second access network device can better satisfy a requirement of the second access network device.

In an optional design, the quantity of first function objects expected to be configured by the second access network device for the terminal is: a maximum quantity of first function objects expected to be configured by the second access network device for the terminal; or a quantity of first function objects expected to be configured by the second access network device for the terminal.

In an optional design, that the first access network device determines a second quantity based on the first information includes: The first access network device determines the second quantity based on the first information and the third information, where the second quantity is less than or equal to the third quantity.

In an optional design, the first access network device receives fourth information from the second access network device, where the fourth information is used to indicate that the second access network device supports the first function.

In an optional design, that the first access network device sends second information to the second access network device includes: The first access network device sends a secondary station addition request message to the second access network device, where the secondary station addition request message includes the second information; or the first access network device sends a secondary station modification request message to the second access network device, where the secondary station modification request message includes the second information.

In an optional design, the secondary station addition request message includes a first information element, the first information element carries the second information, and the first information element is a CG-ConfigInfo information element or a ConfigRestricInfoSCG information element.

In an optional design, the secondary station modification request message includes a second information element, the second information element carries the second information, and the second information element is a CG-ConfigInfo information element or a ConfigRestricInfoSCG information element.

In an optional design, that the first access network device receives third information from the second access network device includes: The first access network device receives a secondary station modification required message from the second access network device, where the secondary station modification required message includes the third information.

In an optional design, the secondary station modification required message includes a third information element, the third information element carries the third information, and the third information element is a CG-ConfigInfo information element or a ConfigRestricModeReqSCG information element.

In an optional design, the first access network device sends configuration information to the terminal device based on the first information and the second quantity, where the configuration information is used to configure the first function object of the terminal or a quantity of first function objects, and the quantity of first function objects that is configured by using the configuration information is less than or equal to a difference between the first quantity and the second quantity. The quantity of DRBs that the first access network device configures for the terminal and to which the first function is applied or the quantity of contexts that are configured for the terminal and that are maintained for the first function is affected by the second quantity determined by the first access network device for the second access network device, so that the function configured by the first access network device and the second access network device for the terminal does not exceed the capability restriction of the terminal.

In an optional design, the first access network device obtains fifth information of the terminal, where the fifth information is used to indicate a capability parameter of the first function supported by the terminal, where the capability parameter includes one or more of the following: a UDC dictionary type, a UDC buffer size, a UDC compression algorithm, a UDC initial dictionary, and a UDC priority. This avoids a communication error caused by a difference between implementation of the first function configured by the first access network device for the terminal and implementation of the first function supported by the terminal.

According to a second aspect, an embodiment of this application provides a communication method. The method includes: A second access network device receives first information from a first access network device, where the first information is used to indicate a first quantity, the first quantity is a quantity of first function objects that the second access network device can configure for a terminal, the first function object is a data radio bearer DRB to which a first function is applied or a context maintained for the first function, and the first function is a data frame compression function, a packet data convergence protocol PDCP replication function, or an Ethernet header compression EHC operation function; and the second access network device sends configuration information to the terminal in response to the first information, where the configuration information is used to configure the first function object or a quantity of first function objects, and the quantity of first function objects that is configured by using the configuration information is less than or equal to the first quantity.

According to the method in the second aspect, the first access network device configures the first function for the terminal based on the first quantity allocated to the first access network device, so that the quantity of DRBs that the first access network device and the second access network device configure for the terminal and to which the first function is applied or the quantity of contexts maintained for the first function does not exceed a capability restriction of the terminal. This avoids a case in which the terminal incorrectly parses a data packet or congestion occurs because a data packet waits to be processed.

In another description manner of the communication method according to the second aspect, the method includes: A second access network device receives first information from a first access network device, where the first information is used to indicate a first quantity, the first quantity is a quantity of data radio bearers DRBs that the second access network device can configure for a terminal and to which a first function is applied, or the first quantity is a quantity of contexts that the second access network device can configure for a terminal and that are maintained for the first function, and the first function is a data frame compression function, a packet data convergence protocol PDCP replication function, or an Ethernet header compression EHC operation function; and the second access network device sends configuration information to the terminal in response to the first information, where the configuration information is used to indicate, to the terminal, a first DRB to which the first function is applied, and a quantity of first DRBs is less than or equal to the first quantity, or the configuration information is used to indicate, to the terminal, a quantity of first contexts that are maintained for the first function, and the quantity of first contexts is less than or equal to the first quantity.

In an optional design, the quantity of first function objects that the second access network device can configure for the terminal is: a maximum quantity of first function objects that the second access network device can configure for the terminal; or a quantity of first function objects to be configured by the second access network device for the terminal.

In an optional design, the second access network device receives second information from the first access network device, where the second information is used to indicate a second quantity, and the second quantity is a quantity of first function objects supported by the terminal.

In an optional design, the second access network device determines a third quantity based on the second information, where the third quantity is a quantity of first function objects expected to be configured by the second access network device for the terminal, and the third quantity is less than or equal to the second quantity; and the second access network device sends third information to the first access network device, where the third information is used to indicate the third quantity. The second access network device can negotiate with the first access network device and adjust, without exceeding the first quantity, the second quantity determined by the first access network device. This improves a negotiation success probability and improves negotiation efficiency.

In an optional design, the second access network device sends fourth information to the first access network device, where the fourth information is used to indicate that the second access network device supports the first function.

In an optional design, that a second access network device receives first information from a first access network device includes: The second access network device receives a secondary station addition request message from the first access network device, where the secondary station addition request message includes the first information; or the second access network device receives a secondary station modification request message from the first access network device, where the secondary station modification request message includes the first information.

In an optional design, that the second access network device sends third information to the first access network device includes: The second access network device sends a secondary station modification required message to the first access network device, where the secondary station modification required message includes the third information.

According to a third aspect, an embodiment of this application provides a communication method. The method includes: A first terminal sends first information, where the first information is used to indicate that the first terminal supports a first function, and the first function is a data frame compression function, a packet data convergence protocol PDCP replication function, or an Ethernet header compression EHC operation function; and the first terminal receives configuration information, where the configuration information is used to configure an SLRB to which the first function is applied or is used to indicate a quantity of contexts maintained for the first function.

According to the method in the third aspect, the function configured for the SLRB of the first terminal is a function supported by the first terminal, so that a communication failure probability of the first terminal can be reduced.

In an optional design, the supporting a first function includes: supporting a receive side function of the first function, and/or supporting a transmit side function of the first function.

In an optional design, that a first terminal sends first information includes: The first terminal sends the first information to a second terminal, where the second terminal can communicate with the first terminal; or the first terminal sends the first information to an access network device.

In an optional design, that the first terminal receives configuration information includes: The first terminal receives the configuration information from the second terminal; or the first terminal receives the configuration information from the access network device.

In an optional design, that the first terminal sends the first information to a second terminal includes: The first terminal sends the first information to the second terminal by using the access network device; or the first terminal sends the first information to the second terminal by using a first network device, where the first network device is configured to store a part or all of the first information.

In an optional design, that the first terminal receives the configuration information from the second terminal includes: The first terminal receives the configuration information from the second terminal by using the first access network device.

In an optional design, that the first terminal receives the configuration information from the first access network device includes: The first terminal receives the configuration information from the first access network device by using the second terminal.

In an optional design, that the first terminal sends the first information to a first access network device includes: The first terminal sends the first information to the first access network device by using the second terminal.

In an optional design, the first terminal sends second information, where the second information is used to indicate a capability parameter of the first function supported by the first terminal, where the capability parameter includes one or more of the following: a quantity of SLRBs that support the first function, a quantity of contexts for which the first function is supported, a UDC buffer size, a UDC compression algorithm, a UDC initial dictionary, and a UDC priority. The capability parameter of the first function is sent, so that the function configured for the SLRB of the first terminal can better match a capability of the first terminal.

In an optional design, that the first terminal sends the first information to a second terminal includes: The first terminal sends an RRC message to the terminal, where the RRC message includes the first information.

According to a fourth aspect, an embodiment of this application provides a communication method. The method includes: A first terminal receives first information from a second terminal, where the first information is used to indicate that the second terminal supports a first function, and the first function is a data frame compression UDC function, a packet data convergence protocol PDCP replication function, or an Ethernet header compression EHC operation function; and the first terminal sends configuration information to the second terminal based on the first information, where the configuration information is used to configure an SLRB to which the first function is applied or is used to indicate a quantity of contexts maintained for the first function.

According to the method in the fourth aspect, the first terminal can configure, for the SLRB of the second terminal, the function supported by the second terminal, so that a probability that communication between the first terminal and the second terminal fails can be reduced.

In an optional design, the supporting a first function includes: supporting a receive side function of the first function, and/or supporting a transmit side function of the first function.

In an optional design, the first terminal receives second information from the second terminal, where the second information is used to indicate a capability parameter of the first function supported by the second terminal, where the capability parameter includes one or any combination of the following: a quantity of SLRBs that support the first function, a quantity of contexts for which the first function is supported, a UDC buffer size, a UDC compression algorithm, a UDC initial dictionary, and a UDC priority. The function configured by the first terminal for the SLRB of the second terminal based on the capability parameter of the first function can better match a capability of the second terminal.

In an optional design, that a first terminal receives first information from a second terminal includes: The first terminal receives an RRC message from the second terminal, where the RRC message includes the first information.

In an optional design, that a first terminal receives first information from a second terminal includes: The first terminal receives the first information from the second terminal by using a first access network device; or the first terminal receives the first information from the second terminal by using a first network device, where the first network device is configured to store a part or all of the first information.

In an optional design, that the first terminal sends configuration information to the second terminal based on the first information includes: The first terminal sends the configuration information to the second terminal by using the first access network device.

According to a fifth aspect, an embodiment of this application provides a communication method. The method includes: A first access network device receives first information from a first terminal, where the first information is used to indicate that the first terminal supports a first function, and the first function is a data frame compression UDC function, a packet data convergence protocol PDCP replication function, or an Ethernet header compression EHC operation function; the first access network device receives second information from a second terminal, where the second information is used to indicate that the second terminal supports the first function; and the first access network device sends configuration information to the first terminal and the second terminal based on the first information and the second information, where the configuration information is used to configure an SLRB to which the first function is applied between the first terminal and the second terminal or is used to indicate a quantity of contexts maintained by the first terminal or the second terminal for the first function.

According to the method in the fifth aspect, the first access network device can configure, for an SLRB between a plurality of terminals, a function supported by each terminal, so that a probability that communication between the terminals fails can be reduced.

In an optional design, the supporting a first function includes: supporting a receive side function of the first function, and/or supporting a transmit side function of the first function.

In an optional design, the first information is further used to indicate a capability parameter of the first function supported by the first terminal, where the capability parameter includes one or any combination of the following: a quantity of SLRBs that support the first function, a quantity of contexts for which the first function is supported, a UDC buffer size, a UDC compression algorithm, a UDC initial dictionary, and a UDC priority. The function configured for the SLRB of the first terminal based on the capability parameter of the first function can better match a capability of the first terminal.

In an optional design, the second information is further used to indicate a capability parameter of the first function supported by the second terminal, where the capability parameter includes one or any combination of the following: a quantity of SLRBs that support the first function, a quantity of contexts for which the first function is supported, a UDC buffer size, a UDC compression algorithm, a UDC initial dictionary, and a UDC priority. The function configured for the SLRB of the second terminal based on the capability parameter of the first function can better match a capability of the second terminal.

In an optional design, that the first access network device sends configuration information to the first terminal and the second terminal based on the first information includes: The first access network device sends the configuration information to the first terminal by using the second terminal.

In an optional design, that a first access network device receives first information from a first terminal includes: The first access network device receives the first information from the first terminal by using the second terminal.

According to a sixth aspect, an embodiment of this application provides a communication method. The method includes: A terminal sends first information, where the first information is used to indicate a first quantity, the first quantity is a quantity of first function objects supported by the terminal, the first function object is a data radio bearer DRB to which a first function is applied or a context maintained for the first function, and the first function is a data frame compression function, a packet data convergence protocol PDCP replication function, or an Ethernet header compression EHC operation function; the terminal receives first configuration information from a first access network device, where the first configuration information is used to configure the first function object or a quantity of first function objects; and the terminal obtains second configuration information from a second access network device, where the second configuration information is used to configure the first function object or a quantity of first function objects, where a sum of the quantities of first function objects that are configured by using the first configuration information and the second configuration information is less than or equal to the first quantity.

According to the method in the sixth aspect, the terminal provides the quantity of first function objects supported by the terminal, so that an access network device learns of a capability restriction of the terminal in a multi-connection scenario, and a sum of functions configured by a plurality of access network devices for the terminal does not exceed the capability restriction of the terminal.

According to a seventh aspect, an embodiment of this application provides a communication apparatus, configured to implement the communication method in the first aspect. The communication apparatus in the seventh aspect includes a corresponding module, unit, or means for implementing the foregoing functions. The module, unit, or means may be implemented by using hardware or software, or implemented by hardware executing corresponding software. The hardware or the software includes one or more modules or units corresponding to the foregoing functions.

According to an eighth aspect, an embodiment of this application provides a communication apparatus, configured to implement the communication method in the second aspect. The communication apparatus in the eighth aspect includes a corresponding module, unit, or means (means) for implementing the foregoing functions. The module, unit, or means may be implemented by using hardware or software, or implemented by hardware executing corresponding software. The hardware or the software includes one or more modules or units corresponding to the foregoing functions.

According to a ninth aspect, an embodiment of this application provides a communication apparatus, configured to implement the communication method in the third aspect. The communication apparatus in the ninth aspect includes a corresponding module, unit, or means for implementing the foregoing functions. The module, unit, or means may be implemented by using hardware or software, or implemented by hardware executing corresponding software. The hardware or the software includes one or more modules or units corresponding to the foregoing functions.

According to a tenth aspect, an embodiment of this application provides a communication apparatus, configured to implement the communication method in the fourth aspect. The communication apparatus in the tenth aspect includes a corresponding module, unit, or means for implementing the foregoing functions. The module, unit, or means may be implemented by using hardware or software, or implemented by hardware executing corresponding software. The hardware or the software includes one or more modules or units corresponding to the foregoing functions.

According to an eleventh aspect, an embodiment of this application provides a communication apparatus, configured to implement the communication method in the fifth aspect. The communication apparatus in the eleventh aspect includes a corresponding module, unit, or means for implementing the foregoing functions. The module, unit, or means may be implemented by using hardware or software, or implemented by hardware executing corresponding software. The hardware or the software includes one or more modules or units corresponding to the foregoing functions.

According to a twelfth aspect, an embodiment of this application provides a communication apparatus, configured to implement the communication method in the sixth aspect. The communication apparatus in the twelfth aspect includes a corresponding module, unit, or means for implementing the foregoing functions. The module, unit, or means may be implemented by using hardware or software, or implemented by hardware executing corresponding software. The hardware or the software includes one or more modules or units corresponding to the foregoing functions.

According to a thirteenth aspect, an embodiment of this application provides a communication apparatus, including a processor. The processor is configured to read instructions from a memory, and run the instructions to implement the method in the first aspect. Optionally, the communication apparatus includes the memory. Optionally, the communication apparatus may be a chip.

According to a fourteenth aspect, an embodiment of this application provides a communication apparatus, including a processor. The processor is configured to read instructions from a memory, and run the instructions to implement the method in the second aspect. Optionally, the communication apparatus includes the memory. Optionally, the communication apparatus may be a chip.

According to a fifteenth aspect, an embodiment of this application provides a communication apparatus, including a processor. The processor is configured to read instructions from a memory, and run the instructions to implement the method in the third aspect. Optionally, the communication apparatus includes the memory. Optionally, the communication apparatus may be a chip.

According to a sixteenth aspect, an embodiment of this application provides a communication apparatus, including a processor. The processor is configured to read instructions from a memory, and run the instructions to implement the method in the fourth aspect. Optionally, the communication apparatus includes the memory. Optionally, the communication apparatus may be a chip.

According to a seventeenth aspect, an embodiment of this application provides a communication apparatus, including a processor. The processor is configured to read instructions from a memory, and run the instructions to implement the method in the fifth aspect. Optionally, the communication apparatus includes the memory. Optionally, the communication apparatus may be a chip.

According to an eighteenth aspect, an embodiment of this application provides a communication apparatus, including a processor. The processor is configured to read instructions from a memory, and run the instructions to implement the method in the sixth aspect. Optionally, the communication apparatus includes the memory. Optionally, the communication apparatus may be a chip.

According to a nineteenth aspect, an embodiment of this application provides a computer-readable storage medium, including instructions. When the instructions are executed on a communication apparatus, the communication apparatus is enabled to implement any one of the foregoing methods.

According to a twentieth aspect, an embodiment of this application provides a computer program product, including instructions. When the instructions are executed on a communication apparatus, the communication apparatus is enabled to implement any one of the foregoing methods.

According to a twenty-first aspect, an embodiment of this application provides a communication system, including the communication apparatus in the seventh aspect or the thirteenth aspect. Optionally, the communication system may further include the communication apparatus in the eighth aspect or the fourteenth aspect.

According to a twenty-second aspect, an embodiment of this application provides a communication system, including the communication apparatus in the ninth aspect or the fifteenth aspect. Optionally, the communication system may further include the communication apparatus in the tenth aspect or the sixteenth aspect. Optionally, the communication system may further include the communication apparatus in the eleventh aspect or the seventeenth aspect. Optionally, the communication system may further include the communication apparatus in the twelfth aspect or the eighteenth aspect.

Based on the solutions of this application, in a multi-connection scenario in which a terminal is connected to a plurality of access network devices, each access network device may negotiate and allocate a quantity, supported by the terminal, of first function objects, so that a quantity, configured by each access network device for the terminal, of the first function objects does not exceed a capability restriction of the terminal, thereby reducing a failure probability of a first function of the terminal, and reducing a communication failure probability.

Based on the solutions of this application, in a scenario of communication between terminals, a terminal capability about a first function is exchanged between the terminals, or terminal capabilities of a plurality of terminals about the first function are learned by using an access network device, so that a function that matches the terminal capability can be configured for an SLRB between the terminals. Therefore, the failure probability of the first function of the terminal is reduced, and the communication failure probability is reduced.

DETAILED DESCRIPTION OF ILLUSTRATIVE EMBODIMENTS

Figure 1:
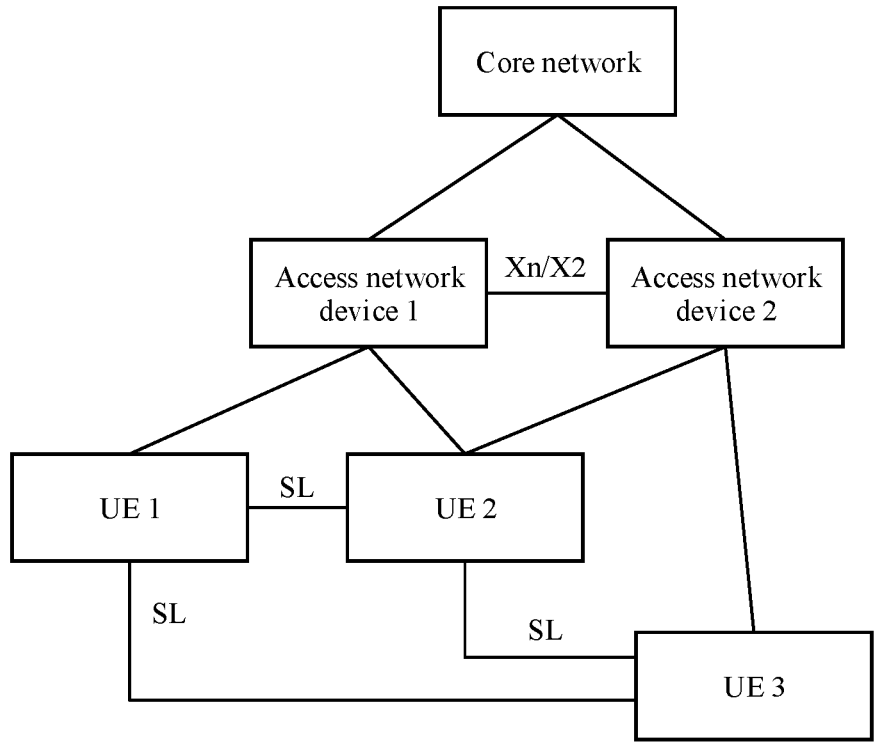
FIG. 1 is a schematic diagram of a communication system according to an embodiment of this application.

To make objectives, technical solutions, and advantages of embodiments of this application clearer, the following describes the technical solutions in embodiments of this application with reference to the accompanying drawings in embodiments of this application.

The technical solutions in embodiments of this application may be applied to a long term evolution (LTE) system and a 5G communication system. With evolution and changes of communication technologies, the solutions in this application may also be applied to another communication system, for example, a 6G communication system. This is not limited in embodiments of this application.

A terminal device in embodiments of this application has a wireless transceiver function, and may be referred to as UE or may be referred to as a terminal for short in this application. The terminal device may be user equipment, an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a public land mobile network (PLMN), or the like. This is not limited in embodiments of this application.

An access network device in embodiments of this application may be a device configured to communicate with the terminal device. The access network device includes but is not limited to an evolved NodeB (eNB), a radio network controller (RNC), a NodeB (NB), a donor eNodeB (donor evolved NodeB, DeNB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a wireless relay node, a wireless backhaul node, a transmission point (TP) or a transmission reception point (TRP), a road side unit (RSU), an access point in an integrated access and backhaul (JAB) system, and the like. The access network device may alternatively be a next generation NB (gNodeB, gNB) or a transmission point (such as a TRP or a TP) in a new radio (NR) system, one antenna panel or a group of antenna panels (including a plurality of antenna panels) in a base station in a 5G system, or a network node forming a gNB or a transmission point, for example, a BBU or a distributed unit (DU). In some deployments, the gNB may include a centralized unit (CU) and a DU. The gNB may further include a remote radio unit (RU). The CU implements a part of functions of the gNB, and the DU implements a part of functions of the gNB. For example, the CU implements functions of an RRC layer and a PDCP layer, and the DU implements functions of an RLC layer, a MAC layer, and a PHY layer. Information at the RRC layer eventually becomes information at the PHY layer, or is converted from information at the PHY layer. Therefore, in this architecture, higher layer signaling, for example, RRC layer signaling or PDCP layer signaling, may also be considered as being sent by the DU or sent by the DU and the RU. It may be understood that the access network device may be a CU node, a DU node, or a device including a CU node and a DU node. In addition, the CU may be classified as a network device in an access network, or the CU may be classified as a network device in a core network (CN). This is not limited herein.

In embodiments of this application, the terminal device or the access network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the access network device, or a function module that can invoke and execute the program and that is in the terminal device or the access network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, and an erasable programmable read-only memory (EPROM), a card, a stick, or a key drive). In addition, various storage media described in this specification may indicate one or more devices and/or other machine readable media that are configured to store information. The term "machine readable media" may include but is not limited to a radio channel, and various other media that can store, include and/or carry instructions and/or data.

FIG. 1 is a schematic diagram of a communication system to which an embodiment of this application is applied. As shown in FIG. 1, the communication system includes a core network and an access network device. A terminal device UE may access the communication system, or may be considered as a part of the communication system. Access network devices may communicate with each other through an Xn or X2 interface. One UE may communicate with a plurality of access network devices, one of the access network devices is a master access network device, where the master access network device exchanges control plane signaling with the UE, and another access network device that communicates with the UE may be referred to as a secondary access network device. In this embodiment of this application, the master access network device is referred to as an MN for short, and the secondary access network device is referred to as an SN for short. If the MN is an LTE-standard base station, the MN may also be referred to as an MeNB. If the MN is an NR-standard base station, the MN may also be referred to as an MgNB. If the SN is an LTE-standard base station, the SN may also be referred to as an SeNB. If the SN is an NR-standard base station, the SN may also be referred to as an SgNB. A scenario in which one UE simultaneously establishes connections to two access network devices, and sends and receives data by using the two connections may be referred to as a dual connectivity scenario. As shown in FIG. 1, the terminal device may further implement direct communication between terminal devices with another terminal device through a sidelink (SL) interface. With evolution and changes of communication technologies, an interface for inter-device communication or a name of the interface may change. This is not limited in this embodiment of this application.

Figure 2:
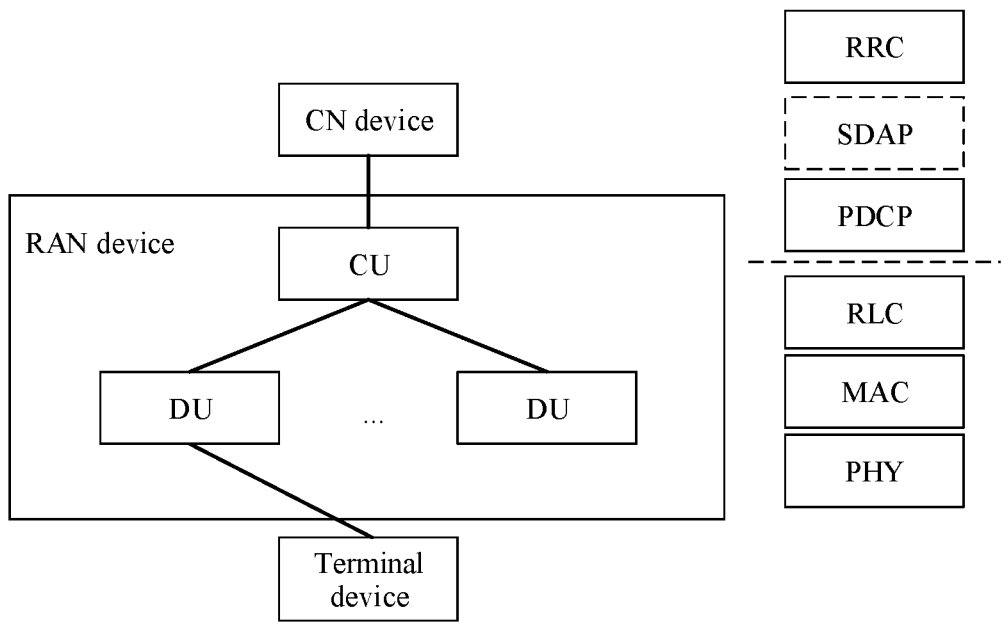
FIG. 2 is a schematic diagram of a structure of a device according to an embodiment of this application.

FIG. 2 shows a communication protocol layer structure between an access network device and UE. The communication protocol layer structure may be applied to the communication system shown in FIG. 1. Communication between the access network device and the UE complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as a PDCP layer, an RLC layer, a MAC layer, and a physical layer. In a possible implementation, a service data adaptation protocol (SDAP) layer may be further included above the PDCP layer. The RAN device may implement functions of protocol layers such as RRC, SDAP, PDCP, RLC, and MAC by using one node or a plurality of nodes.

In the communication system shown in FIG. 1, the UE and the access network device may establish at least one radio bearer (RB) to transmit data. Radio bearers may be classified into a signaling radio bearer (SRB) used for transmitting signaling data and a data radio bearer (DRB) used for transmitting service data. A set of functional entities of a same radio bearer includes one PDCP entity, at least two RLC entities corresponding to the PDCP entity, at least one MAC entity corresponding to the at least two RLC entities, and at least one PHY entity corresponding to the at least one MAC entity.

In the system shown in FIG. 1, UE 2 may establish dual connections to an access network device 1 and an access network device 2. One or more RBs may be separately established between the UE 2 and the access network device 1 and between the UE 2 and the access network device 2.

SLRBs may be established among UE 1, the UE 2, and UE 3, to perform inter-terminal communication. To further improve communication efficiency, the UE 2, the access network device 1, and the access network device 2 may enable some network functions, for example, a data frame compression function, an Ethernet header compression function, and a PDCP replication function. The following further describes the three network functions.

Data frame compression function: In the data frame compression function, a first-in first-out compression buffer is maintained on a compression side, and a data packet is compressed by using content of the buffer and a compression algorithm, and sent. In addition, the data packet is pushed to the compression buffer. In the data frame compression function, a first-in first-out decompression buffer is maintained on a decompression side. When the compressed data packet is received, the data packet is decompressed by using the content of the buffer and a decompression algorithm. After the data packet is decompressed, the data packet is pushed to the decompression buffer. In the foregoing process, a sequence of decompressing data packets needs to be exactly the same as a sequence of sending the data packets on the compression side. Therefore, this function needs to be configured on a PDCP entity associated with an RLC entity in an acknowledged mode. The data frame compression function may be an uplink data compression (UDC) function. When the UDC function is applied to a DRB between the UE and the access network device, data carried by the DRB may be compressed on the UE by using the UDC function and decompressed on the access network device.

EHC function: Data is transmitted by using a wired Ethernet in an industrial control scenario. A 5G system may be used as the last hop of an industrial control network. For example, Ethernet data may be transmitted between a console and a control node through the 5G system. To improve radio resource utilization efficiency, a fixed field in an Ethernet header of an Ethernet data stream may be compressed, for example, a source/destination Ethernet address field of a console and a control node connected to a terminal device. This technology may be referred to as an Ethernet header compression (EHC) technology. When a DRB established by the UE supports the EHC function, an Ethernet header of Ethernet data carried by the DRB may be compressed or decompressed by using the EHC function. Values of compressible fields of different Ethernet data may be different. In an implementation, information that can be compressed or decompressed by using the EHC is used as a context. Different contexts are distinguished by using context IDs. On the decompression side, corresponding context information is established based on a context ID, to perform an EHC operation. The UE maintains a specific quantity of contexts for one or more DRBs to which the EHC function is applied. More contexts maintained by the UE indicate that larger buffer space is required.

PDCP replication function: This function may be understood as duplication transmission at a PDCP layer, and usually means that a data packet of a radio bearer is duplicated at the PDCP layer, to obtain a plurality of identical packets (namely, duplicate packets), and then the plurality of data packets are separately delivered to a plurality of different RLC entities, to transmit the data packets to a MAC layer by using different logical channels. The logical channel is a channel between an RLC layer and the MAC layer. It should be noted that performing transmission again that is commonly mentioned refers to retransmission, but duplication transmission in embodiments of this application is not retransmission. Retransmission refers to transmitting a same data packet again after a transmission failure, or transmitting a same data packet for a plurality of consecutive times. Duplication transmission means that one data packet is duplicated to obtain two data packets, and the two data packets are separately transmitted on two logical channels. Herein, "duplication" may also be understood as "duplicated".

An embodiment of this application provides a communication method, so that when some communication functions are used, a probability that the communication functions fail can be reduced. The following describes the technical solutions of this application by using embodiments.

Figure 3A:
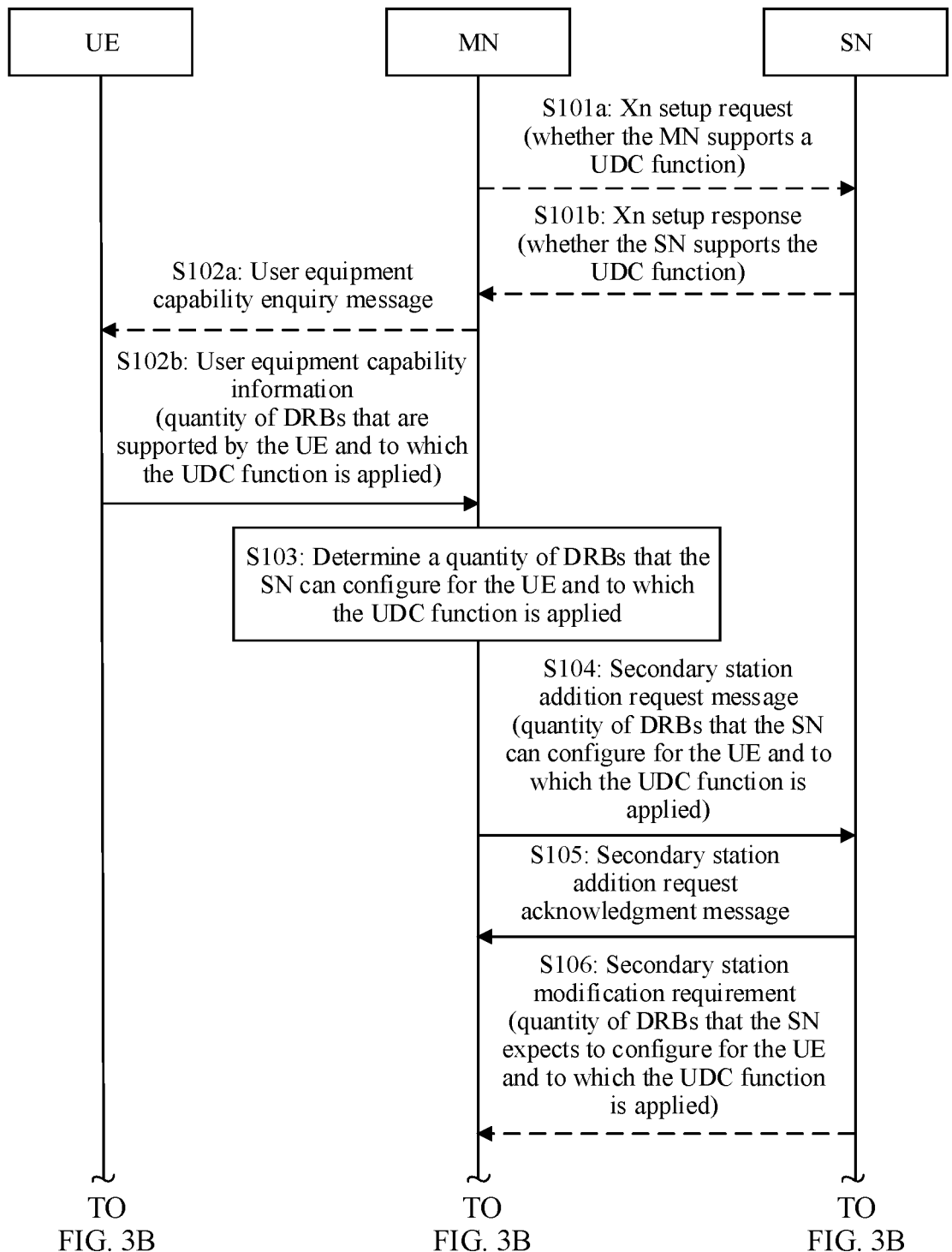
FIG. 3A and FIG. 3B are a schematic flowchart of a communication method according to an embodiment of this application.
Figure 3B:
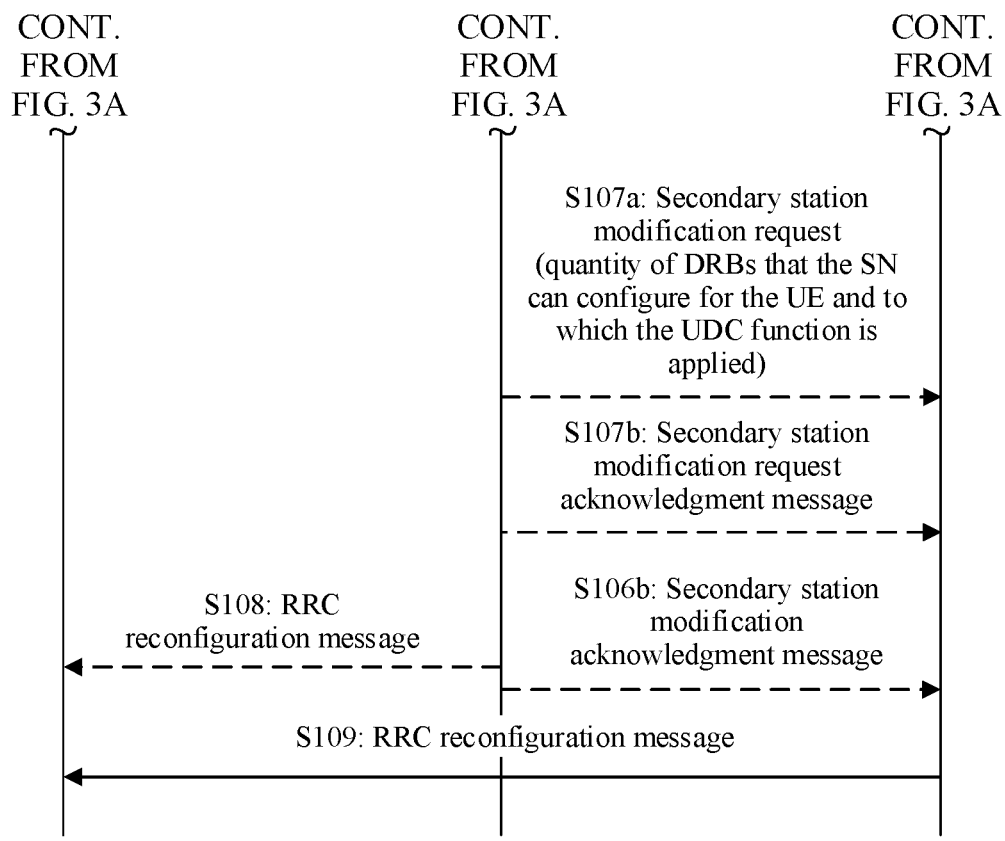

FIG. 3A and FIG. 3B are a schematic flowchart of a communication method according to an embodiment of this application. The communication method in FIG. 3A and FIG. 3B may be applied to a scenario in which a terminal device communicates with a plurality of access network devices. In this embodiment of this application, a UDC function in a dual connectivity scenario is used as an example for description. A core network may be a 5GC or an EPC. For ease of description, this embodiment of this application is mainly described by using the 5GC as an example. In addition, a master access network device may be referred to as an MN for short, and a secondary access network device may be referred to as an SN for short. As shown in FIG. 3A and FIG. 3B, the method includes the following steps.

S101a: The MN sends an Xn setup request message to the SN.

The Xn setup request message may include first indication information, and the first indication information is used to indicate whether the MN supports the UDC function.

In an optional design, an information element "UDC supported" in the Xn setup request may be used to indicate whether the MN supports the UDC function. For example, when the Xn setup request carries the information element, or a value of the information element is true or 1, it indicates that the MN supports the UDC function.

When the core network is the EPC, the message in S101a may be replaced with an X2 setup request message. S101b: The SN sends an Xn setup response to the MN.

The Xn setup response may include second indication information, and the second indication information is used to indicate whether the SN supports the UDC function.

In an optional design, an information element "UDC supported" in the Xn setup response may be used to indicate whether the SN supports the UDC function. For example, when the Xn setup response carries the information element, or a value of the information element is true or 1, it indicates that the SN supports the UDC function.

When the core network is the EPC, the message in S101b may be replaced with an X2 setup response.

Through S101a and S101b, the MN and the SN each may learn whether the other supports the UDC function.

S101a and S101b are optional steps. In another optional implementation, it may be considered by default that the MN and the SN support the UDC function.

The following describes a process in which the MN obtains UE capability information in S102a and S102b. A time sequence relationship between the process in which the MN obtains the UE capability information and S101a and S101b is not limited in this embodiment of this application.

S102a: The MN sends a user equipment capability enquiry UECapabilityEnquiry message to the UE.

The message is used to request to obtain the UE capability information.

S102b: The UE sends the user equipment capability information UECapabilityInformation to the MN.

The user equipment capability information includes a quantity of DRBs that are supported by the UE and to which the UDC function is applied. For ease of description, the quantity is denoted as a first quantity in this embodiment.

In this embodiment of this application, the DRB to which the UDC function is applied may be understood as a UDC function object.

In an optional design, the first quantity may be a maximum quantity of DRBs that are supported by the UE and to which the UDC function is applied.

Optionally, the terminal capability information further includes a parameter that is supported by the UE and that is of the UDC function, where the parameter may include: a UDC dictionary type, a UDC buffer size, a UDC compression algorithm, a UDC initial dictionary, and a UDC priority. The parameter that is supported by the UE and that is of the UDC function is provided, so that a UDC function that better matches a capability of the UE can be configured for the UE when the access network device supports a plurality of UDC functions.

As a substitute for S102a and S102b, the MN may obtain the user equipment capability information from the core network.

S103: The MN determines a quantity of DRBs that the SN can configure for the UE and to which the UDC function is applied.

Specifically, the MN may determine, based on the user equipment capability information, the quantity of DRBs that the SN can configure for the UE and to which the UDC function is applied. For ease of describing the quantity, the quantity is denoted as a second quantity in this embodiment. The second quantity is less than or equal to the first quantity.

The second quantity may be a maximum quantity, determined by the MN, of DRBs that the SN can configure for the UE and to which the UDC function is applied. Alternatively, the second quantity may be a quantity, allocated by the MN to the SN, of DRBs to be configured by the SN for the UE and to which the UDC function is applied. The quantity of DRBs to be configured by the SN for the UE and to which the UDC function is applied may be understood as a quantity of DRBs that the SN needs to or is to configure for the UE and to which the UDC function is applied.

S104: The MN sends a secondary station addition request message to the SN.

The secondary station addition request message includes the second quantity.

In an optional design, one information element or one parameter may be carried in a cell group configuration information (CG-ConfigInfo) information element, to indicate the second quantity. For example, the information element CG-ConfigInfo carried in the secondary station addition request message includes a parameter "Allowed UDC DRB Number" or an information element "Allowed UDC DRB Number", where a value of the "Allowed UDC DRB Number" indicates the second quantity. Optionally, if the CG-ConfigInfo information element does not include "Allowed UDC DRB Number", it may indicate that the second quantity determined by the MN is equal to 0, or indicate that the second quantity determined by the MN is equal to the first quantity. For another example, the information element CG-ConfigInfo carried in the secondary station addition request message includes a secondary cell group configuration restriction information (ConfigRestricInfoSCG) information element, where the information element may include a parameter "allowed-UDC-DRB-Number", and a value of the parameter indicates the second quantity. Optionally, if the ConfigRestricInfoSCG information element does not include the parameter "allowed-UDC-DRB-Number", it may indicate that the second quantity determined by the MN is equal to 0, or indicate that the second quantity determined by the MN is equal to the first quantity.

In an optional implementation based on the foregoing design, the value of "Allowed UDC DRB Number" or "allowed-UDC-DRB-Number" may be an integer from 0 to N, where N may be the quantity of DRBs that are supported by the UE and to which the UDC function is applied, that is, N may be the first quantity. For example, when N=2, the MN may set the value of "Allowed UDC DRB Number" or "allowed-UDC-DRB-Number" to 1, indicating that the quantity of DRBs that the SN can configure for the UE and to which the UDC function is applied is 1, that is, indicating that the second quantity is 1.

Optionally, the secondary station addition request message further includes the first quantity. The MN sends the first quantity to the SN, so that the SN can determine whether to accept allocation of the MN.

Optionally, the secondary station addition request message further includes the parameter that is supported by the UE and that is of the UDC function.

When the SN is an eNB, the secondary station addition request message may be an SeNB Addition Request message.

When the SN is a gNB, the secondary station addition request message may be an SgNB Addition Request message.

S105: The SN sends a secondary station addition request acknowledgment message to the MN.

Optionally, if the SN agrees with the second quantity received in S104, the secondary station addition request acknowledgment message may include third indication information, where the third indication information is used to indicate that the SN agrees with the second quantity.

Optionally, if the SN does not agree with the second quantity received in S104, the secondary station addition request acknowledgment message may include fourth indication information, where the fourth indication information is used to indicate a quantity of DRBs that the SN expects to configure for the UE and to which the UDC function is applied. If the SN receives the first quantity, the SN may determine, based on the first quantity, the quantity of DRBs that the SN expects to configure for the UE and to which the UDC function is applied. For ease of describing the quantity, the quantity is denoted as a third quantity in this embodiment. The third quantity is less than or equal to the first quantity. The third quantity may be a maximum quantity of DRBs that the SN expects to configure for the UE and to which the UDC function is applied. Alternatively, the third quantity may be a quantity of DRBs that the SN expects to be to configure for the UE and to which the UDC function is applied. The quantity of DRBs that the SN expects to be to configure for the UE and to which the UDC function is applied may be understood as a quantity of DRBs that the SN expects to need to or be to configure for the UE and to which the UDC function is applied.

Optionally, if the SN does not support the UDC function, and the MN is not notified, in S101a and S101b, of information that the SN does not support the UDC function, the secondary station addition request acknowledgment message includes fifth indication information, where the fifth indication information is used to indicate that the SN does not support the UDC function.

When the SN is an eNB, the secondary station addition request acknowledgment message may be an SeNB Addition Request Acknowledge.

When the SN is a gNB, the secondary station addition request acknowledgment message may be an SgNB Addition Request Acknowledge.

S106a: The SN sends a secondary station modification required SN Modification Required message to the MN.

The secondary station modification required message includes the quantity of DRBs that the SN expects to configure for the UE and to which the UDC function is applied, that is, the secondary station modification requirement includes the third quantity described in S105.

S106a is an optional step.

If the SN does not agree with the second quantity received in S104, the third quantity may be included in the secondary station addition request acknowledgment message in S105. If the SN expects to change a quantity of DRBs that has been configured for the UE and to which the UDC function is applied, the third quantity may be included in the secondary station modification requirement in S106a.

In an optional design, one information element or one parameter may be included in a cell group configuration information (CG-ConfigInfo) information element, to indicate the third quantity. For example, the information element CG-ConfigInfo carried in the secondary station modification required message includes a parameter or information element "Requested UDC DRB Number", where a value of "Requested UDC DRB Number" indicates the third quantity. Alternatively, for example, the information element CG-ConfigInfo carried in the secondary station modification required message includes a secondary cell group configuration restriction mode request ("ConfigRestricModeReqSCG") information element, where the information element may include a parameter "requested-UDC-DRB-Number", and a value of the parameter indicates the third quantity.

In an optional implementation based on the foregoing design, the value of "Requested UDC DRB Number" or "requested-UDC-DRB-Number" may be an integer from 0 to N, where N may be the quantity of DRBs that are supported by the UE and to which the UDC function is applied, that is, N may be the first quantity. For example, when N=2, the SN may set the value of "Requested UDC DRB Number" or "requested-UDC-DRB-Number" to 1, indicating that the quantity of DRBs that the SN expects to configure for the UE and to which the UDC function is applied is 1, that is, indicating that the third quantity is 1.

Optionally, when the MN and the SN are connected to the EPC, S106 is as follows: The SN sends a secondary station modification required SgNB Modification Required message to the MN.

S107a: The MN sends a secondary station modification request SN Modification Request to the SN.

The secondary station modification request includes a quantity, re-determined by the MN, of DRBs that the SN can configure for the UE and to which the UDC function is applied.

Specifically, the MN re-determines, based on the terminal capability information and the secondary station modification requirement in S106, the quantity of DRBs that the SN can configure for the UE and to which the UDC function is applied. For ease of description, the quantity is denoted as a fourth quantity in this embodiment of this application. The fourth quantity is less than or equal to the first quantity. Optionally, the fourth quantity is less than or equal to the third quantity.

In an optional design, one information element or one parameter may be included in a cell group configuration information (CG-ConfigInfo) information element, to indicate the fourth quantity. For example, the information element CG-ConfigInfo carried in the secondary station modification request message includes a parameter or information element "Allowed UDC DRB Number", where a value of "Allowed UDC DRB Number" indicates the fourth quantity. Optionally, if the CG-ConfigInfo information element does not include the parameter or information element "Allowed UDC DRB Number", it may indicate that the fourth quantity determined by the MN is equal to the third quantity. Alternatively, for example, the information element CG-ConfigInfo carried in the secondary station modification request message includes a secondary cell group configuration restriction information (ConfigRestricInfoSCG) information element, where the information element may include a parameter "allowed-UDC-DRB-Number", and a value of the parameter indicates the fourth quantity. Optionally, if the ConfigRestricInfoSCG information element does not include the parameter "Allowed UDC DRB Number", it may indicate that the fourth quantity determined by the MN is equal to the third quantity.

S107a and S107b are optional steps. If the MN re-determines the quantity of DRBs that the SN can configure for the UE and to which the UDC function is applied, S107a and S107b are performed. If the MN does not determine the fourth quantity, or the fourth quantity re-determined by the MN is equal to the second quantity, S107a and S107b may not be performed.

S107b: The SN sends a secondary station modification request acknowledgment message SN Modification Request Acknowledge to the MN.

Specifically, in response to S107a, the SN sends the secondary station modification request acknowledgment message.

S106b: The MN sends a secondary station modification acknowledgment message to the SN.

Specifically, in response to S106a, the MN sends the secondary station modification acknowledgment message.

S108: The MN sends an RRC reconfiguration message to the UE.

The message includes configuration information of a DRB between the MN and the UE.

Specifically, one or more DRBs are established between the MN and the UE. The RRC reconfiguration message includes one or more pieces of configuration information, and each piece of configuration information corresponds to one DRB between the MN and the UE. If the configuration information of the DRB includes UDC information, the DRB is a DRB to which the UDC function is applied. In an optional design, the UDC information may be represented by using a field or an information element. For example, a supported UDC field in the configuration information may be used to indicate that the UDC function is applied to the DRB corresponding to the configuration information. Alternatively, for example, an information element uplinkDataCompression may be used to indicate that a parameter of the UDC function is applied to the DRB corresponding to the configuration information. For the parameter, refer to the parameter of the UDC function in S102.

A quantity of DRBs, including the UDC information, in the configuration information is less than or equal to a difference between the first quantity and the second quantity.

Optionally, if S107a and S107b are performed, a quantity of DRBs, including the UDC information, in the configuration information is less than or equal to a difference between the first quantity and the fourth quantity.

S108 is an optional step. If a quantity of DRBs that the MN configures for the UE and to which the UDC function is applied needs to be changed, or different DRBs need to be selected to apply the UDC function, S108 may be performed. A moment at which S108 is performed is not limited in this embodiment of this application.

S109: The SN sends an RRC reconfiguration message to the UE.

The message includes configuration information of a DRB between the SN and the UE.

Specifically, one or more DRBs are established between the SN and the UE. The RRC reconfiguration message includes one or more pieces of configuration information, and each piece of configuration information corresponds to one DRB between the SN and the UE. If the configuration information of the DRB includes UDC information, the DRB is a DRB to which the UDC function is applied.

A quantity of DRBs, including the UDC information, in the configuration information is less than or equal to the second quantity. In an example, if the second quantity is the quantity, determined by the MN, of DRBs that the SN needs to configure for the UE and to which the UDC function is applied, a quantity of DRBs whose configuration information includes the UDC information, in the DRBs between the SN and the UE is equal to the second quantity.

Optionally, if S107a and S107b are performed, a quantity of DRBs whose configuration information includes the UDC information, in the DRBs between the SN and the UE is less than or equal to the fourth quantity.

A name of the information element or the parameter is not limited in this embodiment of this application.

Through the foregoing S103, S104, S106, S107a, and S109, the MN can allocate the quantity of DRBs that the SN can configure for the UE and to which the UDC function is applied, so that a sum of the quantity of DRBs that the MN configures for the UE and to which the UDC function is applied and the quantity of DRBs that the SN configures for the UE and to which the UDC function is applied does not exceed the quantity of DRBs that are supported by the UE and to which the UDC function is applied. This avoids a case, caused because the function configured by the MN and the SN for the UE exceeds a capability restriction of the UE, in which an error occurs when the UE processes a data packet or congestion occurs because a data packet waits to be processed.

In this embodiment of this application, the communication method shown in FIG. 3A and FIG. 3B is described by using an example in which the quantity of DRBs that are supported by the UE and to which the UDC function is applied is negotiated between the MN and the SN. A person skilled in the art may understand that the communication method shown in FIG. 3A and FIG. 3B may alternatively be used to negotiate, between the MN and the SN, a quantity of DRBs that are supported by the UE and to which a PDCP replication function is applied, a quantity of DRBs that are supported by the UE and to which an EHC function is applied, or a quantity of DRBs that are supported by the UE and to which another function is applied. Details are not described herein.

Another optional implementation for negotiating, between the MN and the SN, the quantity of DRBs that are supported by the UE and to which the EHC function is applied is as follows: In S104, the MN sends, to the SN, the quantity of DRBs that are supported by the UE and to which the EHC function is applied, and the MN further sends RRC configuration information of the MN to the SN, where the RRC configuration information may be used by the MN to configure, for the UE, the DRB to which the EHC function is applied. The SN determines, based on the quantity of DRBs that are supported by the UE and to which the EHC function is applied and the RRC configuration information of the MN, a quantity of DRBs that the SN can configure for the UE and to which the EHC function is applied. The SN sends RRC configuration information to the UE based on the quantity. The RRC configuration information is used by the SN to configure, for the UE, the DRB to which the EHC function is applied.

Figure 4A:
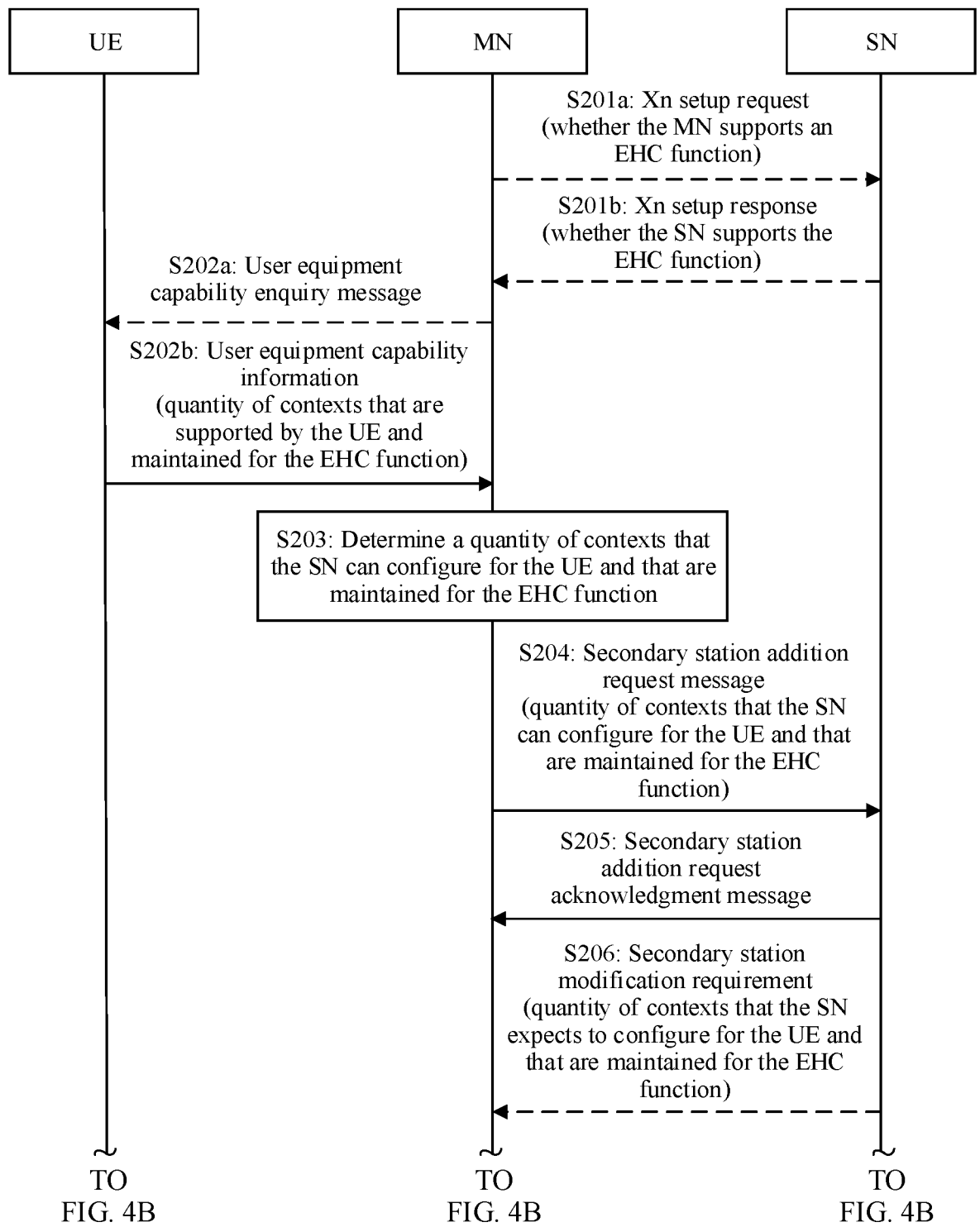
FIG. 4A and FIG. 4B are a schematic flowchart of another communication method according to an embodiment of this application.
Figure 4B:
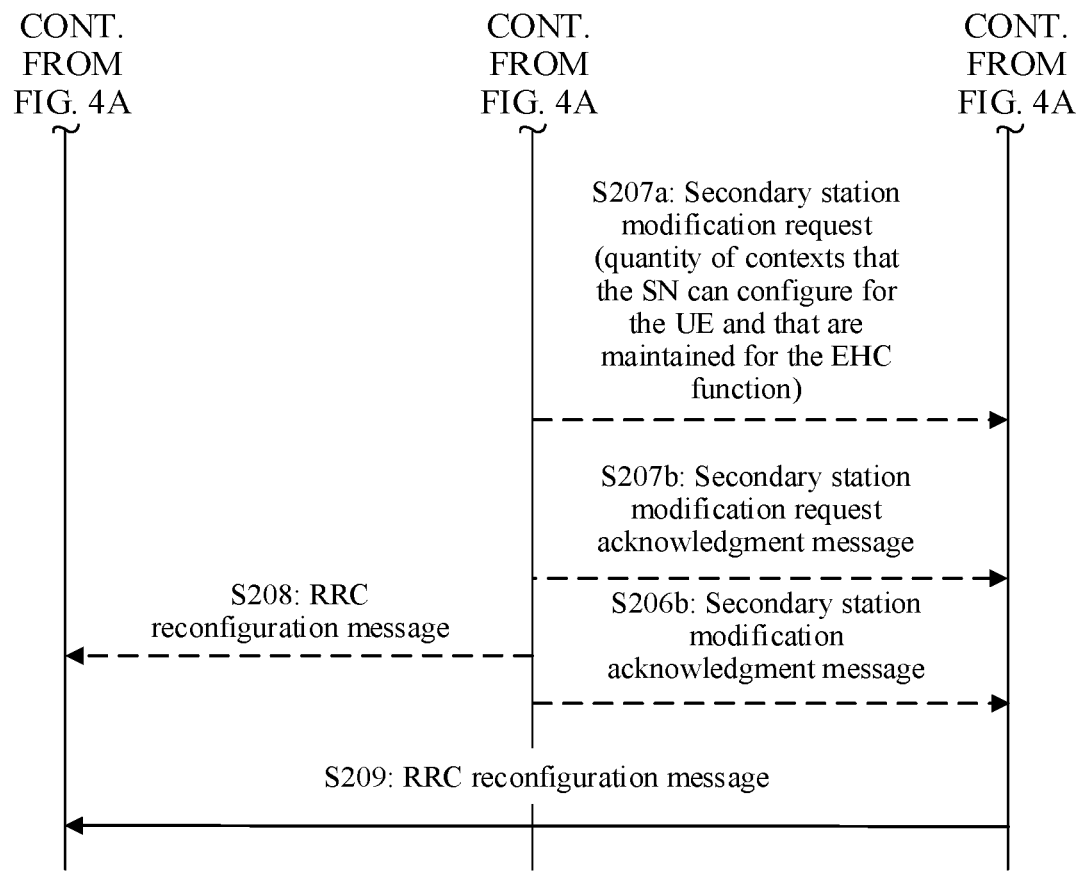

FIG. 4A and FIG. 4B are a schematic flowchart of another communication method according to an embodiment of this application. The communication method in FIG. 3A and FIG. 3B may be applied to a scenario in which a terminal device communicates with a plurality of access network devices. In this embodiment of this application, an EHC function in a dual connectivity scenario is used as an example for description. A core network may be a 5GC or an EPC. For ease of description, this embodiment of this application is mainly described by using the 5GC as an example. In addition, a master access network device may be referred to as an MN for short, and a secondary access network device may be referred to as an SN for short. A difference between the method shown in FIG. 4A and FIG. 4B and the method shown in FIG. 3A and FIG. 3B lies in that, in the method shown in FIG. 4A and FIG. 4B, the MN allocates, to the SN, a quantity of contexts maintained by the UE for the EHC function, instead of a quantity of DRBs that are supported by the UE and to which a UDC function is applied. As shown in FIG. 4A and FIG. 4B, the method includes the following steps.

S201a: The MN sends an Xn setup request message to the SN.

The Xn setup request message may include first indication information, and the first indication information is used to indicate whether the MN supports the EHC function.

For details, refer to S101a.

S201b: The SN sends an Xn setup response to the MN.

The Xn setup response may include second indication information, and the second indication information is used to indicate whether the SN supports the EHC function.

For details, refer to S101b.

S5202a: The MN sends a user equipment capability enquiry UECapabilityEnquiry message to the UE, to request to obtain UE capability information.

For details, refer to S102a.

S202b: The UE sends the user equipment capability information UECapabilityInformation to the MN.

The user equipment capability information includes a quantity of contexts that are supported by the UE and that are maintained for the EHC function. For ease of describing the quantity, the quantity is denoted as a first quantity in this embodiment.

In an example, the quantity may be a maximum quantity of contexts that are supported by the UE and that are maintained for the EHC function.

Optionally, the MN may obtain the user equipment capability information from the core network, but does not obtain the user equipment capability information from the UE. The core network may obtain the user equipment capability information from the UE and store the user equipment capability information.

S203: The MN determines a quantity of contexts that the SN can configure for the UE and that are maintained for the EHC function.

Specifically, the MN determines, based on the user equipment capability information, the quantity of contexts that the SN can configure for the UE and that are maintained for the EHC function. For ease of describing the quantity, the quantity is denoted as a second quantity in this embodiment. The second quantity is less than or equal to the first quantity.

Specifically, the second quantity may be understood as a maximum quantity of contexts that can be created when the EHC function is applied to a DRB between the UE and the SN.

In an example, the second quantity may be a maximum quantity, determined by the MN, of contexts that the SN can configure for the UE and that are maintained for the EHC function. Alternatively, the second quantity may be a quantity, determined by the MN, of contexts that the SN needs to or is to configure for the UE and that are maintained for the EHC function.

S204: The MN sends a secondary station addition request message to the SN.

The secondary station addition request message includes the second quantity.

For details, refer to S104.

S205: The SN sends a secondary station addition request acknowledgment message to the MN.

Optionally, the SN may include third indication information, where the third indication information is used to indicate that the SN agrees with the second quantity. Alternatively, the SN may include fourth indication information, where the fourth indication information is used to indicate that the SN does not support the EHC function. Alternatively, the SN may include fifth indication information, where the fifth indication information is used to indicate a quantity of contexts that the SN expects to configure for the UE and that are maintained for the EHC function.

Optionally, the SN may determine, based on the first quantity, the quantity of contexts that the SN expects to configure for the UE and that are maintained for the EHC function. For ease of describing the quantity, the quantity is denoted as a third quantity in this embodiment. The third quantity is less than or equal to the first quantity. In an example, the third quantity may be a maximum quantity of contexts that the SN expects to configure for the UE and that are maintained for the EHC function. Alternatively, the third quantity may be a quantity of contexts that the SN expects to need to or be to configure for the UE and that are maintained for the EHC function.

Optionally, if the secondary station addition request acknowledgment message does not include any one of the third indication information, the fourth indication information, or the fifth indication information, it may indicate that the SN agrees with the second quantity.

Optionally, whether the MN and the SN support the EHC function may not be exchanged through S101a and S101b, but the SN sends the secondary station addition request acknowledgment message to the MN, so that the MN learns of whether the SN supports the EHC function.

Optionally, when the SN is an eNB, the secondary station addition request acknowledgment message is an SeNB Addition Request Acknowledge.

Optionally, when the SN is a gNB, the secondary station addition request acknowledgment message is an SgNB Addition Request Acknowledge.

S206a: The SN sends a secondary station modification required SN Modification Required message to the MN.

The secondary station modification required message includes the quantity of contexts that the SN expects to configure for the UE and that are maintained for the EHC function, namely, the third quantity described in S205.

S206a is an optional step. If the SN does not agree with the second quantity received in S204, or the SN expects to change the quantity of contexts that are configured for the UE and that are maintained for the EHC function, the SN may send the third quantity to the MN, that is, perform S206a.

Specifically, the SN determines the third quantity based on the first quantity received in S204. The third quantity is less than or equal to the first quantity.

In an example, the third quantity may be a maximum quantity of contexts that the SN expects to configure for the UE and that are maintained for the EHC function. Alternatively, the third quantity may be a quantity of contexts that the SN expects to need to or be to configure for the UE and that are maintained for the EHC function.

For details, refer to S106.

S207a: The MN sends a secondary station modification request SN Modification Request to the SN.

The secondary station modification request includes a quantity, re-determined by the MN, of contexts that the SN can configure for the UE and that are maintained for the EHC function.

Specifically, the MN re-determines, based on the terminal capability information and the secondary station modification requirement in S206, the quantity of contexts that the SN can configure for the UE and that are maintained for the EHC function. For ease of description, the quantity is denoted as a fourth quantity in this embodiment of this application. The fourth quantity is less than or equal to the first quantity. Optionally, the fourth quantity is less than or equal to the third quantity.

For details, refer to S107a.

S207b: The SN sends a secondary station modification request acknowledgment message SN Modification Request Acknowledge to the MN.

For details, refer to S107b.

S206b: The MN sends a secondary station modification acknowledgment message to the SN.

For details, refer to S106b.

S208: The MN sends an RRC reconfiguration message to the UE.

The message includes configuration information of a DRB between the MN and the UE. Specifically, one or more DRBs are established between the MN and the UE. The RRC reconfiguration message includes one or more pieces of configuration information, and each piece of configuration information corresponds to one DRB between the MN and the UE.

The configuration information of the DRB may include sixth indication information, used to indicate a maximum quantity of contexts that can be maintained for the EHC function of the DRB. For example, the configuration information includes a maxCID field, and a value of the field is used to indicate the maximum quantity. A sum of maximum quantities of contexts maintained by DRBs to which the EHC function is applied does not exceed a difference between the first quantity and the second quantity. In other words, maxCIDs of the DRBs to which the EHC function is applied may be different, but a sum of values of the maxCID field does not exceed the difference between the first quantity and the second quantity.

Optionally, if S107a and S107b are performed, the sum of the maximum quantities of contexts maintained by the DRBs to which the EHC function is applied does not exceed a difference between the first quantity and the fourth quantity.

For details, refer to S108.

S209: The SN sends an RRC reconfiguration message to the UE.

The message includes configuration information of a DRB between the SN and the UE. Specifically, one or more DRBs are established between the SN and the UE. The RRC reconfiguration message includes one or more pieces of configuration information, and each piece of configuration information corresponds to one DRB between the SN and the UE.

The configuration information of the DRB may include sixth indication information, used to indicate a maximum quantity of contexts that can be maintained for the EHC function of the DRB. For example, the configuration information includes a maxCID field, and a value of the field is used to indicate the maximum quantity. A sum of maximum quantities of contexts maintained by DRBs to which the EHC function is applied does not exceed the second quantity. In other words, maxCIDs of the DRBs to which the EHC function is applied may be different, but a sum of values of the maxCID fields does not exceed the second quantity.

Optionally, if S107a and S107b are performed, the sum of the maximum quantities of contexts maintained by the DRBs to which the EHC function is applied does not exceed the fourth quantity.

Through the foregoing process, the MN and the SN may negotiate and divide the quantity of contexts that are supported by the UE and that are maintained for the EHC function. This avoids a case in which the UE cannot completely create a context and cannot correctly implement the EHC function because a sum of quantities of contexts created by the MN and SN in a process of applying the EHC function exceeds a quantity of contexts that can be maintained by the UE.

Another optional implementation for negotiating and dividing, between the MN and the SN, the quantity of contexts that are supported by the UE and that are maintained for the EHC function is as follows: In S204, the MN sends, to the SN, the quantity of contexts that are supported by the UE and that are maintained for the EHC function, and the MN further sends RRC configuration information of the MN to the SN, where the RRC configuration information may be used by the MN to configure, for the UE, the DRB to which the EHC function is applied, and the RRC configuration information includes the quantity of contexts maintained for applying the EHC function. The SN determines, based on the quantity of contexts that are supported by the UE and that are maintained for the EHC function and the RRC configuration information of the MN, the quantity of contexts that the SN can configure for the UE and that are maintained for the EHC function. The SN sends RRC configuration information to the UE based on the quantity, where the RRC configuration information is used by the SN to configure, for the UE, the DRB to which the EHC function is applied, and the RRC configuration information includes the quantity of contexts maintained for applying the EHC function.

In this embodiment of this application, the communication method shown in FIG. 4A and FIG. 4B is described by using an example in which the quantity of contexts that are supported by the UE and that are maintained for the EHC function is negotiated between the MN and the SN. A person skilled in the art may understand that the communication method shown in FIG. 4A and FIG. 4B may alternatively be used to negotiate, between the MN and the SN, a quantity of contexts that are supported by the UE and that are maintained for another function. Details are not described herein.

Figure 5:
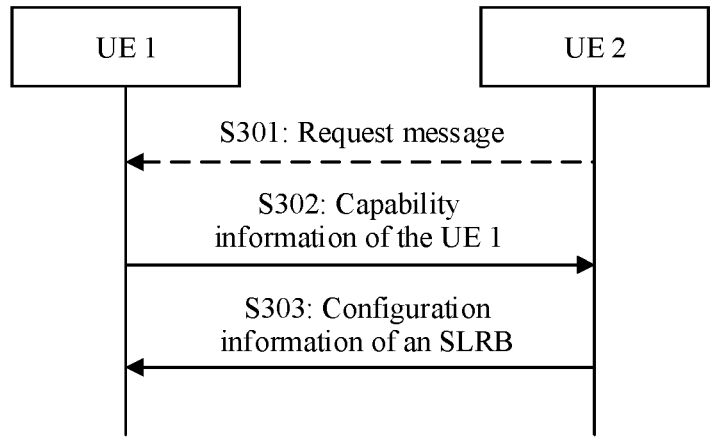
FIG. 5 is a schematic flowchart of still another communication method according to an embodiment of this application.

FIG. 5 is another schematic flowchart of a communication method according to an embodiment of this application. The communication method shown in FIG. 5 may be applied to a scenario of communication between terminal devices. In this embodiment of this application, communication between UE 1 and UE 2 is used as an example to describe the technical solutions of this application. The UE 1 and the UE 2 shown in FIG. 5 may perform unicast communication, multicast communication, or broadcast communication. The communication method shown in FIG. 5 includes the following steps.

S301: The UE 2 sends a request message to the UE 1, where the request message is used to request capability information of the UE 1.

S301 is an optional step.

S302: The UE 1 sends the capability information of the UE 1 to the UE 2.

Specifically, the capability information includes a UDC capability of a sidelink interface of the UE 1. The UDC capability includes a capability of supporting a UDC compression side function, a capability of supporting a UDC decompression side function, or a capability of supporting both the UDC compression side function and the UDC decompression side function. When the sidelink interface of the UE 1 supports the UDC compression side function, data frame compression may be performed, in a PDCP entity of the UE 1, on data carried by an SLRB of the UE 1. When the sidelink interface of the UE 1 supports the UDC decompression side function, the UE 1 may perform, after receiving data carried by an SLRB, data frame decompression in a PDCP entity of the UE 1.

Optionally, the UDC capability further includes a quantity of SLRBs that are supported by the UE 1 and to which a UDC function is applied.

Optionally, the UDC capability further includes a parameter of the UDC function supported by the sidelink interface of the UE 1, where the parameter may include: a UDC dictionary type, a UDC buffer size, a UDC compression algorithm, a UDC initial dictionary, and a UDC priority.

S303: The UE 2 sends configuration information of an SLRB to the UE 1.

Specifically, the UE 2 determines, based on the capability information of the UE 1, a function that can be applied to the SLRB between the UE 2 and the UE 1. The configuration information of the SLRB between the UE 2 and the UE 1 may include information about a UDC function applied to the SLRB.

Optionally, the UE 2 determines, based on a default quantity, a quantity of SLRBs to which the UDC function is applied in SLRBs between the UE 2 and the UE 1, where configuration information of an SLRB to which the UDC function is applied includes information about the UDC function.

Optionally, the UE 2 determines, based on the quantity of SLRBs that are supported by the UE 1 and to which the UDC function is applied in S302, the quantity of SLRBs to which the UDC function is applied in the SLRBs between the UE 2 and the UE 1, where the configuration information of the SLRB to which the UDC function is applied includes the information about the UDC function.

Optionally, for a design of the information, included in the configuration information, about the UDC function, refer to the design of the UDC information in S108.

Optionally, in this embodiment of this application, content of communication between the UE 1 and the UE 2 may be carried in sidelink RRC signaling, may be carried in uplink signaling, for example, PC5-S signaling, or may be carried in non-access stratum (NAS) signaling. This is not specifically limited.

The capability information of the UE 1 is provided, so that the UE 2 can configure, for the SLRB of the UE 1, the function supported by the UE 1. This avoids a transmission error caused by sending, by the UE 2, a data packet that cannot be processed by the UE 1. The quantity of SLRBs that support the UDC function and that are of the UE 1 is further provided, so that a quantity of SLRBs that the UE 2 configures for the UE 1 and to which the UDC function is applied does not exceed a restriction of the quantity of SLRBs that are of the UE 1 and to which the UDC function is applied. This avoids a case in which an error occurs when the UE 1 processes a data packet or congestion occurs because a data packet waits to be processed.

In this embodiment of this application, the communication method shown in FIG. 5 is described by using an example in which the UDC function supported by the UE 1 and the UDC function supported by the UE 2 are negotiated between the UE 1 and the UE 2. A person skilled in the art may understand that the communication method shown in FIG. 5 may alternatively be used to negotiate, between the UE 1 and the UE 2, a PDCP replication function supported by the UE 1 and a PDCP replication function supported by the UE 2, an EHC function supported by the UE 1 and an EHC function supported by the UE 2, or another function supported by the UE 1 and another function supported by the UE 2. Details are not described herein.

Figure 6:
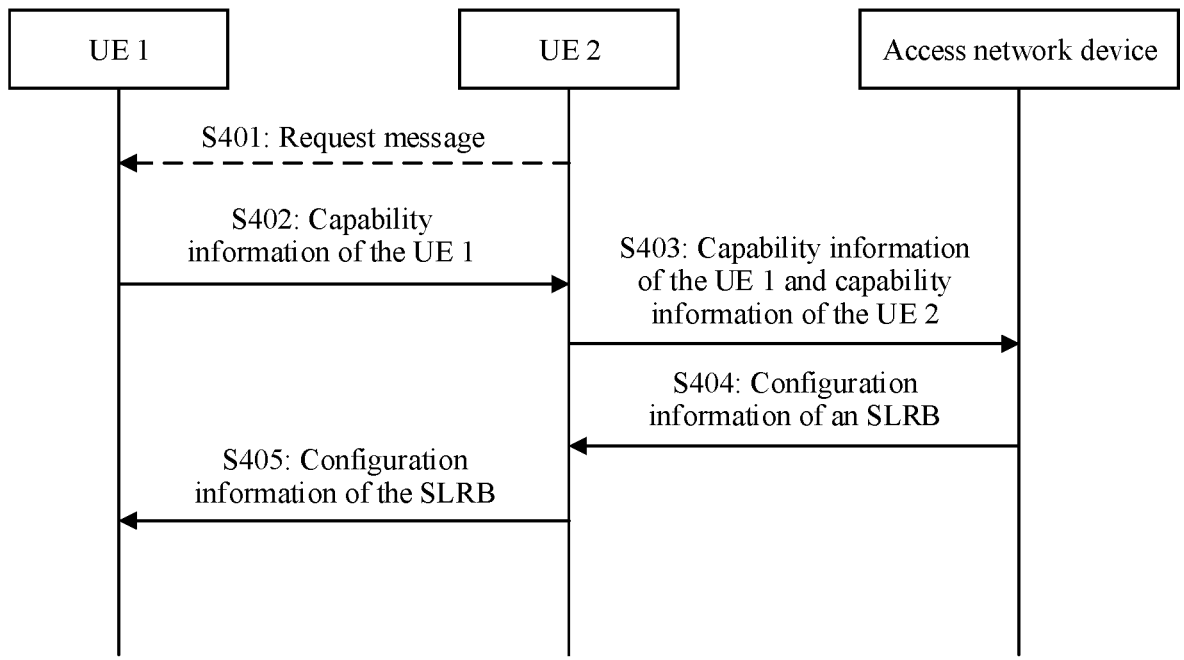
FIG. 6 is a schematic flowchart of still another communication method according to an embodiment of this application.

FIG. 6 is another schematic flowchart of a communication method according to an embodiment of this application. The communication method shown in FIG. 6 may be applied to a scenario of communication between terminal devices. In this embodiment of this application, communication between UE 1 and UE 2 is used as an example to describe the technical solutions of this application. The UE 1 and the UE 2 shown in FIG. 6 perform unicast communication. A difference between the communication method shown in FIG. 6 and the communication method shown in FIG. 5 lies in that an access network device instead of the UE 2 determines configuration information of an SLRB between the UE 1 and the UE 2. The communication method shown in FIG. 6 includes the following steps.

S402: The UE 2 sends a request message to the UE 1, where the request message is used to request capability information of the UE 1.

This step is an optional step.

S402: The UE 1 sends the capability information of the UE 1 to the UE 2.

For details, refer to S302. Details are not described herein again.

S403: The UE 2 sends the capability information of the UE 1 and capability information of the UE 2 to the access network device.

For content of the capability information of the UE 2, refer to the description of the capability information of the UE 1 in S302. Details are not described herein again.

S404: The access network device sends, to the UE 2, the configuration information of the SLRB between the UE 1 and the UE 2.

Specifically, the access network device determines that unicast communication is performed between the UE 1 and the UE 2. The access network device determines the configuration information of the SLRB between the UE 1 and the UE 2 based on the capability information of the UE 1 and the capability information of the UE 2.

S405: The UE 2 sends the configuration information of the SLRB to the UE 1.

Specifically, the UE 2 may send, to the UE 1, the configuration information that is of the SLRB and that is received by the UE 2 in S404.

The capability information of the UE 1 and the capability information of the UE 2 are provided, so that the access network device can configure, for the SLRB established between the UE 1 and the UE 2, a function supported by the UE 1 and a function supported by the UE 2. This avoids a transmission error caused because the UE 2 and the UE 1 cannot process a data packet sent by each other. A quantity of SLRBs that support a UDC function and that are of the UE 1 and a quantity of SLRBs that support the UDC function and that are of the UE 2 are further provided, so that a quantity, configured by the access network device for the UE 2 and the UE 1, of SLRBs to which the UDC function is applied does not exceed a restriction of the quantity of SLRBs that are of the UE 1 and the UE 2 and to which the UDC function is applied. This avoids a case in which an error occurs when the UE 1 or the UE 2 processes a data packet or congestion occurs because a data packet waits to be processed.

In this embodiment of this application, the communication method shown in FIG. 5 is described by using an example in which the UDC function supported by the UE 1 and the UDC function supported by the UE 2 are negotiated by using the access network device. A person skilled in the art may understand that the communication method shown in FIG. 5 may alternatively be used to negotiate, between the UE 1 and the UE 2, a PDCP replication function supported by the UE 1 and a PDCP replication function supported by the UE 2, an EHC function supported by the UE 1 and an EHC function supported by the UE 2, or another function supported by the UE 1 and another function supported by the UE 2. Details are not described herein.

Figure 7:
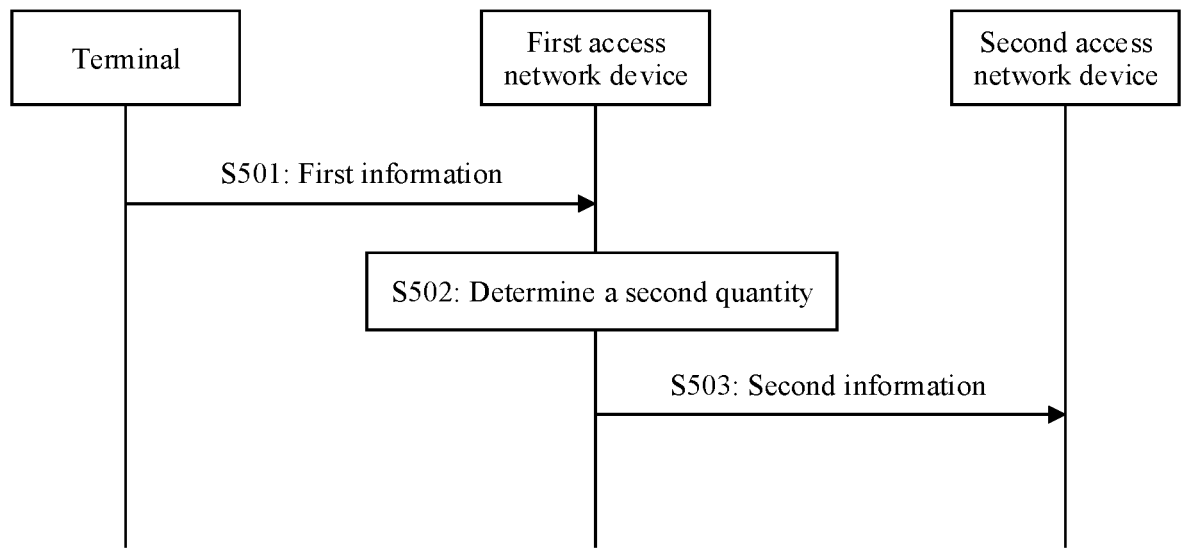
FIG. 7 is a schematic flowchart of still another communication method according to an embodiment of this application.

FIG. 7 is another schematic flowchart of a communication method according to an embodiment of this application. The communication method shown in FIG. 7 may be applied to a scenario in which a terminal communicates with a plurality of access network devices. A first access network device may be the MN in FIG. 3A and FIG. 3B, a first access network device may be the SN in FIG. 3A and FIG. 3B, and the terminal may be the UE in FIG. 3A and FIG. 3B. The communication method shown in FIG. 7 includes the following steps.

S501: The first access network device obtains first information of the terminal.

The first information is used to indicate a first quantity, the first quantity is a quantity of first function objects supported by the terminal, the first function object is a data radio bearer DRB to which a first function is applied or a context maintained for the first function, and the first function is a data frame compression function, a packet data convergence protocol PDCP replication function, or an Ethernet header compression EHC operation function.

For details, refer to S102.

S502: The first access network device determines a second quantity based on the first information.

The second quantity is a quantity of first function objects that the second access network device can configure for the terminal, and the second quantity is less than or equal to the first quantity.

For details, refer to S103.

S503: The first access network device sends second information to the second access network device.

The second information is used to indicate the second quantity.

For details, refer to S104, S107a, and S107b.

Optionally, the quantity of first function objects supported by the terminal is a maximum quantity of first function objects supported by the terminal. For details, refer to S102.

Optionally, a quantity of contexts that are supported by the terminal and that are maintained for the first function is a maximum quantity of contexts that are supported by the terminal and that are maintained for the first function. For details, refer to S102.

Optionally, the quantity of first function objects that the second access network device can configure for the terminal is: a maximum quantity of first function objects that the second access network device can configure for the terminal; or a quantity of first function objects to be configured by the second access network device for the terminal. For details, refer to S103.

Optionally, the first access network device sends the first information to the second access network device. For details, refer to S104.

Optionally, the first access network device receives third information from the second access network device, where the third information is used to indicate a third quantity, the third quantity is a quantity of first function objects that the second access network device expects to configure for the terminal, and the third quantity is less than or equal to the first quantity. For details, refer to S106.

Optionally, the quantity of first function objects that the second access network device expects to configure for the terminal is: a maximum quantity of first function objects that the second access network device expects to configure for the terminal; or a quantity of first function objects that the second access network device expects to be to configure for the terminal. For details, refer to S106.

Optionally, S502 includes: The first access network device determines the second quantity based on the first information and the third information, where the second quantity is less than or equal to the third quantity. For details, refer to S107.

Optionally, the second access network device receives fourth information from the first access network device, where the fourth information is used to indicate that the first access network device supports the first function. For details, refer to S101.

Optionally, S503 includes: The second access network device sends a secondary station addition request message to the first access network device, where the secondary station addition request message includes the second information; or the second access network device sends a secondary station modification request message to the first access network device, where the secondary station modification request message includes the second information. For details, refer to S104 and S107.

Optionally, that the second access network device receives third information from the first access network device includes: The second access network device receives the secondary station modification required message from the first access network device, where the secondary station modification required message includes the third information. For details, refer to S106.

Optionally, the first access network device sends configuration information to the terminal device based on the first information and the second quantity, where the configuration information is used to configure the first function object of the terminal or a quantity of first function objects, and the quantity of first function objects that is configured by using the configuration information is less than or equal to a difference between the first quantity and the second quantity. For details, refer to S108.

Optionally, the second access network device obtains fifth information of the terminal, where the fifth information is used to indicate a capability parameter of the first function supported by the terminal, where the capability parameter includes one or more of the following: a UDC dictionary type, a UDC buffer size, a UDC compression algorithm, a UDC initial dictionary, and a UDC priority. For details, refer to S102.

Through the foregoing S501, S502, and S503, the second access network device and the first access network device may negotiate and divide the quantity of DRBs that are supported by the terminal and to which the first function is applied, and may further negotiate and divide the quantity of contexts that are supported by the terminal and that are maintained for the DRB to which the first function is applied. This avoids a case, caused because the function configured by the second access network device and the first access network device for the terminal exceeds a capability restriction of the terminal, in which an error occurs when the terminal processes a data packet or congestion occurs because a data packet waits to be processed.

Figure 8:
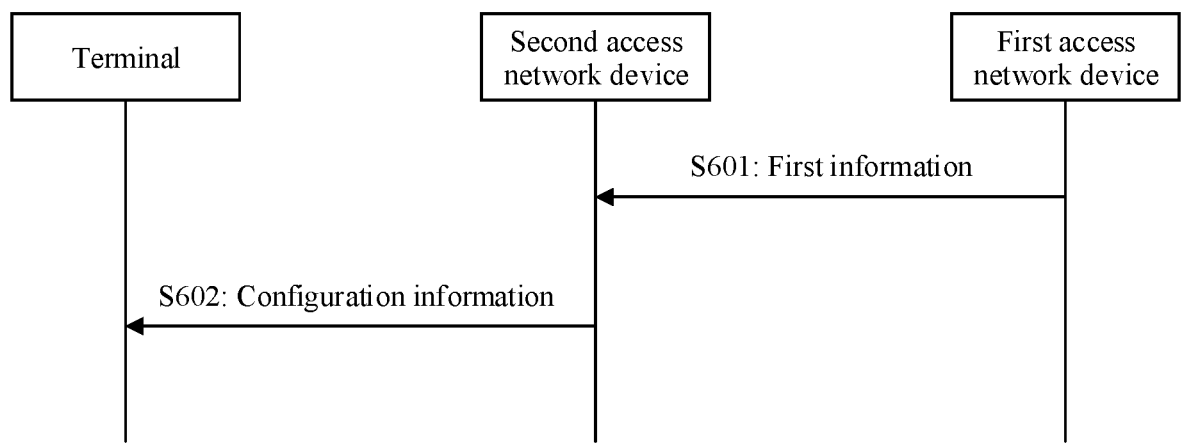
FIG. 8 is a schematic flowchart of still another communication method according to an embodiment of this application.

FIG. 8 is another schematic flowchart of a communication method according to an embodiment of this application. The communication method shown in FIG. 8 may be applied to a scenario in which a terminal communicates with a plurality of access network devices. A first access network device may be the SN in FIG. 3A and FIG. 3B, a second access network device may be the MN in FIG. 3A and FIG. 3B, and the terminal may be the UE in FIG. 3A and FIG. 3B. The communication method shown in FIG. 8 includes the following steps.

S601: The second access network device receives first information from the first access network device.

The first information is used to indicate a first quantity, the first quantity is a quantity of first function objects that the second access network device can configure for the terminal, the first function object is a data radio bearer DRB to which a first function is applied or a context maintained for the first function, and the first function is a data frame compression function, a packet data convergence protocol PDCP replication function, or an Ethernet header compression EHC operation function.

For details, refer to S104 and S107.

S602: The second access network device sends configuration information to the terminal in response to the first information.

The configuration information is used to configure the first function object or a quantity of first function objects, and the quantity of first function objects that is configured by using the configuration information is less than or equal to the first quantity.

For details, refer to S109.

Optionally, the quantity of first function objects that the second access network device can configure for the terminal is: a maximum quantity of first function objects that the second access network device can configure for the terminal; or a quantity of first function objects to be configured by the second access network device for the terminal. For details, refer to S103.

Optionally, the second access network device receives second information from the first access network device, where the second information is used to indicate a second quantity, and the second quantity is a quantity of first function objects supported by the terminal. For details, refer to S104.

Optionally, the second access network device determines a third quantity based on the second information, where the third quantity is a quantity of first function objects that the second access network device expects to configure for the terminal, and the third quantity is less than or equal to the second quantity; and the second access network device sends third information to the first access network device, where the third information is used to indicate the third quantity. For details, refer to S105.

Optionally, the second access network device sends fourth information to the first access network device, where the fourth information is used to indicate that the second access network device supports the first function. For details, refer to S101.

Optionally, S601 includes: The first access network device receives a secondary station addition request message from the second access network device, where the secondary station addition request message includes the first information; or the first access network device receives a secondary station modification request message from the second access network device, where the secondary station modification request message includes the first information. For details, refer to S104 and S107.

Optionally, that the first access network device sends third information to the second access network device includes: The first access network device sends a secondary station modification required message to the second access network device, where the secondary station modification required message includes the third information. For details, refer to S107.

Through the foregoing S601 and S602, the first access network device and the second access network device may negotiate and divide the quantity of DRBs that are supported by the terminal and to which the first function is applied, and may further negotiate and divide the quantity of contexts that are supported by the terminal and that are maintained for the DRB to which the first function is applied. This avoids a case, caused because the function configured by the first access network device and the second access network device for the terminal exceeds a capability restriction of the terminal, in which an error occurs when the terminal processes a data packet or congestion occurs because a data packet waits to be processed.

Figure 9:
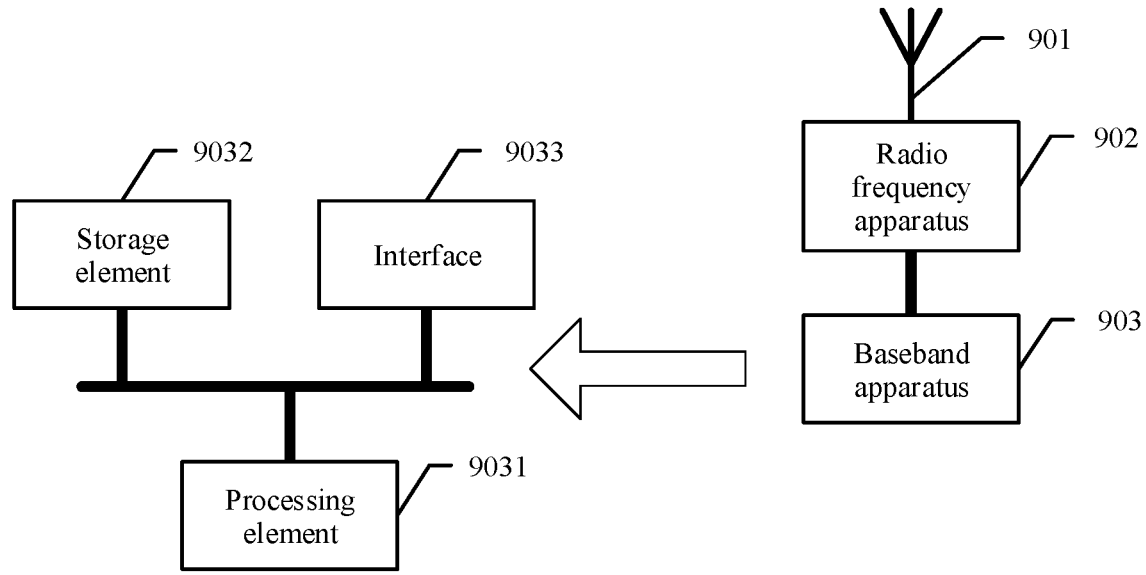
FIG. 9 is a schematic diagram of a structure of a terminal apparatus according to an embodiment of this application.

FIG. 9 shows a communication apparatus according to an embodiment of this application. The communication apparatus may be configured to implement, for example, a function of the MN in FIG. 3A and FIG. 3B, a function of the MN in FIG. 4A and FIG. 4B, or a function of the first access network device in FIG. 7. The apparatus may alternatively be configured to implement, for example, a function of the SN in FIG. 3A and FIG. 3B, a function of the SN in FIG. 4A and FIG. 4B, or a function of the second access network device in FIG. 8. The apparatus may alternatively be configured to implement, for example, a function of the access network device in FIG. 6. FIG. 9 is a schematic diagram of a structure of a communication apparatus 900 according to an embodiment of this application. The communication apparatus 900 includes an antenna 901, a radio frequency apparatus 902, and a baseband apparatus 903. The antenna 901 is connected to the radio frequency apparatus 902. In an uplink direction, the radio frequency apparatus 902 receives, by using the antenna 901, information sent by a terminal, and sends, to the baseband apparatus 903 for processing, information sent by user equipment. In a downlink direction, the baseband apparatus 903 processes information about the terminal, and sends the information to the radio frequency apparatus 902. The radio frequency apparatus 902 processes the information about the user equipment, and then sends the processed information to the terminal by using the antenna 901.

The baseband apparatus 903 may include one or more processing elements 9031, for example, include a main control CPU and another integrated circuit. In addition, the baseband apparatus 903 may further include a storage element 9032 and an interface 9033. The storage element 9032 is configured to store computer-executable instructions for executing the solutions of this application, and the processing element 9031 controls the execution. The interface 9033 is configured to exchange information with the radio frequency apparatus 902, and the interface is, for example, a common public radio interface (common public radio interface, CPRI). The processing element 9031 is configured to execute the computer-executable instructions stored in the storage element 9032, to implement the function of the MN in FIG. 3A and FIG. 3B, the function of the MN in FIG. 4A and FIG. 4B, or the function of the first access network device in FIG. 7; implement, for example, the function of the SN in FIG. 3A and FIG. 3B, the function of the SN in FIG. 4A and FIG. 4B, or the function of the second access network device in FIG. 8; or implement the function of the access network device in FIG. 6. The computer-executable instructions in this embodiment of this application may also be referred to as application program code. This is not specifically limited in this embodiment of this application. In the foregoing embodiments, the methods and/or the steps implemented by the first network element or the first apparatus may alternatively be implemented by a chip on the baseband apparatus 903, where the chip includes at least one processing element and an interface circuit. The processing element is configured to perform steps of any method performed by the first network element or the first apparatus, and the interface circuit is configured to communicate with another apparatus.

The communication apparatus 900 shown in FIG. 9 may be configured to implement, for example, the function of the MN in FIG. 3A and FIG. 3B, the function of the MN in FIG. 4A and FIG. 4B, or the function of the first access network device in FIG. 7.

Optionally, the baseband apparatus 903 is specifically configured to implement the function of determining the second quantity allocated to the second access network device in S103 and S502.

Optionally, the interface 9033 is specifically configured to implement the function of sending the interface establishment request in S101a.

Optionally, the interface 9033 is specifically configured to implement the function of receiving the interface establishment response in S101b.

Optionally, the antenna 901 is specifically configured to implement the function of receiving the user terminal capability information in S101b and S501.

Optionally, the interface 9033 is specifically configured to implement the function of sending the second quantity allocated to the second access network device in S104 and S503.

Optionally, the interface 9033 is specifically configured to implement the function of receiving the secondary station modification required message in S106.

Optionally, the interface 9033 is specifically configured to implement the function of sending the secondary station modification request in S107a.

Optionally, the antenna 901 is specifically configured to implement the function of sending the configuration information in S108.

The communication apparatus 900 shown in FIG. 9 may be configured to implement, for example, the function of the SN in FIG. 3A and FIG. 3B, the function of the SN in FIG. 4A and FIG. 4B, or the function of the second access network device in FIG. 8.

Optionally, the baseband apparatus 903 is specifically configured to implement the function of determining the expected third quantity in S105.

Optionally, the interface 9033 is specifically configured to implement the function of receiving the interface establishment request in S101a.

Optionally, the interface 9033 is specifically configured to implement the function of sending the interface establishment response in S101b.

Optionally, the interface 9033 is specifically configured to implement the function of receiving the second quantity allocated to the first access network device in S104, S107a, and S601.

Optionally, the interface 9033 is specifically configured to implement the function of sending the expected third quantity in S106.

Optionally, the antenna 901 is specifically configured to implement the function of sending the configuration information in S109 and S602.

The communication apparatus 900 shown in FIG. 9 may be configured to implement, for example, the function of the access network device in FIG. 6.

Optionally, the baseband apparatus 903 is specifically configured to implement the function of determining the configuration information of the SLRB in S404.

Optionally, the antenna 901 is specifically configured to implement the function of receiving the capability information of the UE 1 and the capability information of the UE 2 in S403.

Optionally, the antenna 901 is specifically configured to implement the function of sending the configuration information of the SLRB in S404.

The communication apparatus 900 may be a general-purpose apparatus or a dedicated apparatus. For example, the communication apparatus 900 may be a network server, a base station, or a device having a structure similar to that in FIG. 9. A type of the communication apparatus 900 is not limited in this embodiment of this application.

It may be understood that in the foregoing embodiment, the methods and/or steps implemented by the MN in FIG. 3A and FIG. 3B, the MN in FIG. 4A and FIG. 4B, the first access network device in FIG. 7, the function of the SN in FIG. 3A and FIG. 3B, the function of the SN in FIG. 4A and FIG. 4B, the second access network device in FIG. 8, or the access network device in FIG. 6 may alternatively be implemented by a chip system that implements the functions of the foregoing apparatus.

Figure 10:
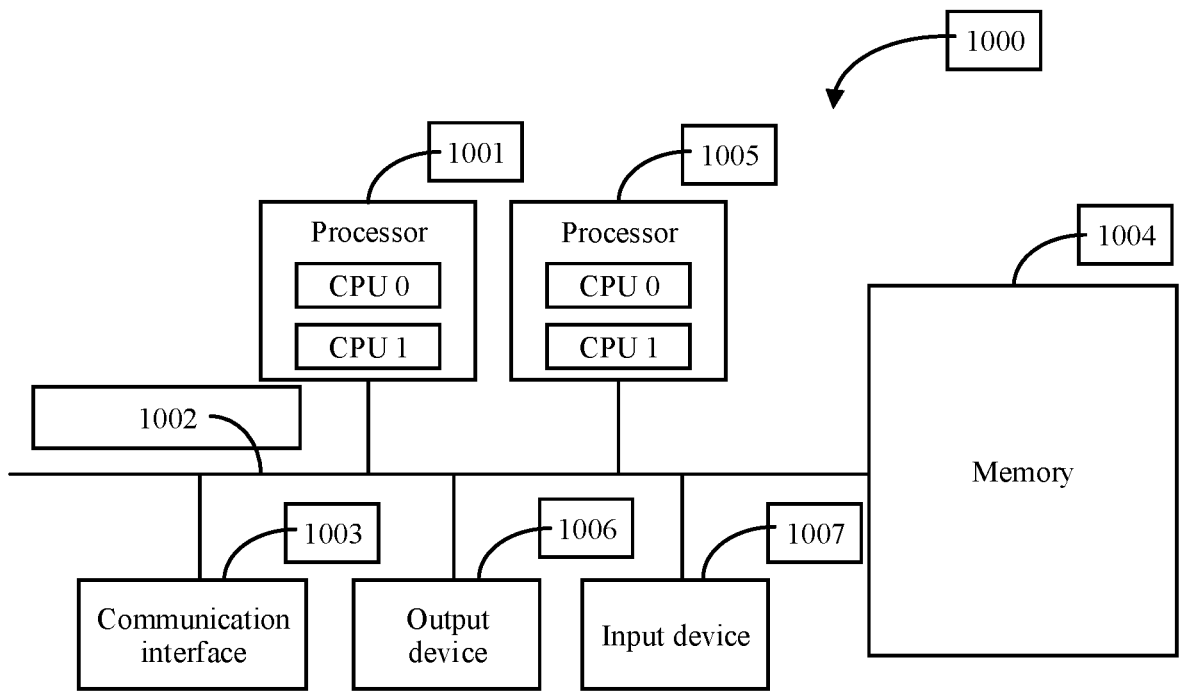
FIG. 10 is a schematic diagram of a structure of an access network apparatus according to an embodiment of this application.

FIG. 10 shows a communication apparatus according to an embodiment of this application. The apparatus may be configured to implement, for example, a function of the UE 1 in FIG. 5 or a function of the UE 1 in FIG. 6. The apparatus may alternatively be configured to implement, for example, a function of the UE 2 in FIG. 5. The apparatus may alternatively be configured to implement, for example, a function of the UE 2 in FIG. 6.

FIG. 10 is a schematic diagram of a structure of a communication apparatus 1000 according to an embodiment of this application. The communication apparatus 1000 includes one or more processors 1001, a communication line 1002, and at least one communication interface (in FIG. 10, only an example in which a communication interface 1003 and one processor 1001 are included is used for description). Optionally, the communication device 1000 may further include a memory 1004.

The processor 1001 may be a general-purpose central processing unit (central processing unit, CPU), a microprocessor, an application-specific integrated circuit (application-specific integrated circuit, ASIC), or one or more integrated circuits configured to control program execution of the solutions in this application.

The communication line 1002 is used to connect different components.

The communication interface 1003 may be a transceiver module, and is configured to communicate with another device, a communication apparatus, or a communication network, for example, the Ethernet, a RAN, or a wireless local area network (wireless local area network, WLAN). For example, the transceiver module may be an apparatus such as a transceiver or a transceiver, or may be a network adapter or a fiber switch apparatus. Optionally, the communication interface 1003 may alternatively be a transceiver circuit located in the processor 1001, and is configured to implement signal input and signal output of the processor.

The memory 1004 may be an apparatus having a storage function. The memory 1004 may be a read-only memory (ROM) or another type of static storage device that can store static information and static instructions; or a random access memory (RAM) or another type of dynamic storage device that can store information and instructions; or may be an electrically erasable programmable read-only memory (EEPROM), a compact disc read-only memory (CD-ROM) or another compact disc storage medium, an optical disc storage medium (including a compact disc, a laser disc, an optical disc, a digital versatile disc, a Blu-ray disc, or the like), a magnetic disk storage medium, another magnetic storage device, or any other medium that can be configured to carry or store expected program code in a form of an instruction or a data structure and that is accessible by a computer, but is not limited thereto. The memory may exist independently, and is connected to the processor by using the communication line 1002. The memory may alternatively be integrated with the processor.

The memory 1004 is configured to store computer-executable instructions for executing the solutions in this application, and the execution is controlled by the processor 1001. The processor 1001 is configured to execute the computer-executable instructions stored in the memory 1004, to implement the function of the UE 1 in FIG. 5, the function of the UE 1 in FIG. 6, the function of the UE 2 in FIG. 5, or the function of the UE 2 in FIG. 6 in this application. The computer-executable instructions in this embodiment of this application may also be referred to as application program code. This is not specifically limited in this embodiment of this application.

During specific implementation, in an embodiment, the communication apparatus 1000 may further include an output device 1006 and an input device 1007. The output device 1006 communicates with the processor 1001, and may display information in a plurality of manners.

During specific implementation, in an embodiment, the processor 1001 may include one or more CPUs, for example, a CPU 0 and a CPU 1 in FIG. 10.

During specific implementation, in an embodiment, the communication apparatus 1000 may include a plurality of processors such as the processor 1001 and a processor 1005 in FIG. 10. Each of the processors may be a single-CPU processor, or may be a multi-CPU processor. The processor herein may be one or more devices, circuits, and/or processing cores configured to process data (for example, computer program instructions).

The communication apparatus 1000 shown in FIG. 10 may be configured to implement, for example, the function of the UE 1 in FIG. 5 or the function of the UE 1 in FIG. 6.

Optionally, the processor 1001 is specifically configured to implement the function of performing configuration based on the configuration information of the SLRB in S303 and S405.

Optionally, the input device 1007 is specifically configured to implement the function of receiving the request message in S301 and S401.

Optionally, the output device 1006 is specifically configured to implement the function of sending the capability information of the UE 1 in S302 and S402.

Optionally, the input device 1007 is specifically configured to implement the function of receiving the configuration information of the SLRB in S303 and S405.

The communication apparatus 1000 shown in FIG. 10 may be configured to implement, for example, the function of the UE 2 in FIG. 5 or the function of the UE 2 in FIG. 6.

Optionally, the processor 1001 is specifically configured to implement the function of determining the configuration of the SLRB in S303.

Optionally, the output device 1006 is specifically configured to implement the function of sending the request information in S301 and S401.

Optionally, the input device 1007 is specifically configured to implement the function of receiving the capability information of the UE 1 in S302 and S402.

Optionally, the output device 1006 is specifically configured to implement the function of sending the capability information of the UE 1 and the capability information of the UE 2 in S403.

Optionally, the input device 1007 is specifically configured to implement the function of receiving the configuration information of the SLRB in S404.

Optionally, the output device 1006 is specifically configured to implement the function of sending the configuration information of the SLRB in S303 and S405.

The communication apparatus 1000 may be a general-purpose apparatus or a dedicated apparatus. For example, the communication apparatus 1000 may be a network server, an embedded device, a desktop computer, a portable computer, a mobile phone, a tablet computer, a wireless terminal device, or a device having a structure similar to that in FIG. 10. A type of the communication apparatus 1000 is not limited in this embodiment of this application.

It may be understood that in the foregoing embodiments, the methods and/or steps implemented by the UE 1 in FIG. 5, the UE 1 in FIG. 6, the UE 2 in FIG. 5, or the UE 2 in FIG. 6 may alternatively be implemented by a chip system that implements the functions of the foregoing apparatus.

Figure 11:
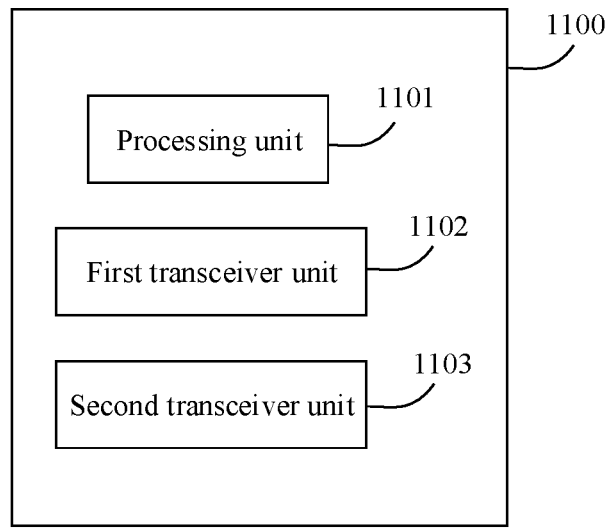
FIG. 11 is a schematic diagram of a structure of another terminal apparatus according to an embodiment of this application.

FIG. 11 shows a communication apparatus according to an embodiment of this application. The communication apparatus may be configured to implement, for example, a function of the MN in FIG. 3A and FIG. 3B, a function of the MN in FIG. 4A and FIG. 4B, or a function of the first access network device in FIG. 7. Alternatively, the communication apparatus may be configured to implement, for example, a function of the SN in FIG. 3A and FIG. 3B, a function of the SN in FIG. 4A and FIG. 4B, or a function of the second access network device in FIG. 8. Alternatively, the communication apparatus may be configured to implement, for example, a function of the access network device in FIG. 6. In this embodiment of this application, the communication apparatus may be divided into functional units based on the foregoing method embodiment. For example, each functional unit may be obtained through division based on each corresponding function, or two or more units may be integrated into one processing module. The integrated unit may be implemented in a form of hardware, or may be implemented in a form of a software function module. It should be noted that the unit division in this embodiment of this application is an example, and is merely logical function division, or may be other division during actual implementation.

FIG. 11 is a schematic diagram of a structure of a communication apparatus 1100 according to an embodiment of this application. The communication apparatus 1100 includes a processing unit 1101, a first transceiver unit 1102, and a second transceiver unit 1103. The second transceiver unit 1103 may be an air interface transceiver unit.

The communication apparatus 1100 shown in FIG. 11 may be configured to implement, for example, the function of the MN in FIG. 3A and FIG. 3B, the function of the MN in FIG. 4A and FIG. 4B, or the function of the first access network device in FIG. 7.

Optionally, the processing unit 1101 is specifically configured to implement the function of determining the second quantity allocated to the second access network device in S103 and S502.

Optionally, the transceiver unit 1102 is specifically configured to implement the function of sending the interface establishment request in S101a.

Optionally, the transceiver unit 1102 is specifically configured to implement the function of receiving the interface establishment response in S101b.

Optionally, the transceiver unit 1103 is specifically configured to implement the function of receiving the user terminal capability information in S102b and S501.

Optionally, the transceiver unit 1102 is specifically configured to implement the function of sending the second quantity allocated to the second access network device in S104 and S503.

Optionally, the transceiver unit 1102 is specifically configured to implement the function of receiving the secondary station modification required message in S106.

Optionally, the transceiver unit 1102 is specifically configured to implement the function of sending the secondary station modification request in S107a.

Optionally, the transceiver unit 1103 is specifically configured to implement the function of sending the configuration information in S108.

The communication apparatus 1100 shown in FIG. 11 may be configured to implement, for example, the function of the SN in FIG. 3A and FIG. 3B, the function of the SN in FIG. 4A and FIG. 4B, or the function of the second access network device in FIG. 8.

Optionally, the processing unit 1101 is specifically configured to implement the function of determining the expected third quantity in S105.

Optionally, the transceiver unit 1102 is specifically configured to implement the function of receiving the interface establishment request in S101a.

Optionally, the transceiver unit 1102 is specifically configured to implement the function of sending the interface establishment response in S101b.

Optionally, the transceiver unit 1102 is specifically configured to implement the function of receiving the second quantity allocated to the first access network device in S104, S107a, and S601.

Optionally, the transceiver unit 1102 is specifically configured to implement the function of sending the expected third quantity in S106.

Optionally, the transceiver unit 1103 is specifically configured to implement the function of sending the configuration information in S109 and S602.

The communication apparatus 1100 shown in FIG. 11 may be configured to implement, for example, the function of the access network device in FIG. 6.

Optionally, the processing unit 1101 is specifically configured to implement the function of determining the configuration information of the SLRB in S404.

Optionally, the transceiver unit 1103 is specifically configured to implement the function of receiving the capability information of the UE 1 and the capability information of the UE 2 in S403.

Optionally, the transceiver unit 1103 is specifically configured to implement the function of sending the configuration information of the SLRB in S404. Specifically, the processor in the communication apparatus shown in FIG. 9 may invoke the computer-executable instructions stored in the memory, to implement a function/an implementation process of the transceiver unit 1102 and the processing unit 1101 in FIG. 11. Alternatively, a function/an implementation process of the processing unit 1101 in FIG. 11 may be implemented by the processor in the communication apparatus shown in FIG. 9 by invoking the computer-executable instructions stored in the memory, and a function/an implementation process of the transceiver unit 1102 in FIG. 11 may be implemented through the communication interface in the communication apparatus shown in FIG. 9.

Figure 12:
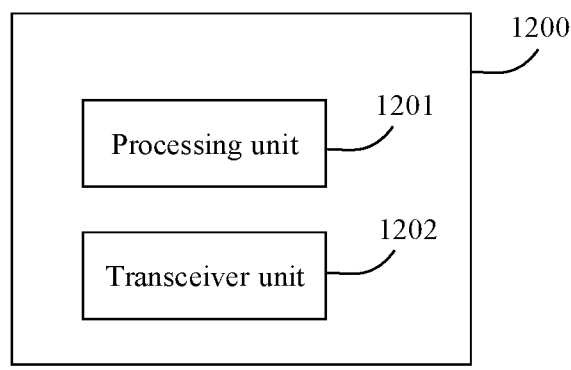
FIG. 12 is a schematic diagram of a structure of another access network apparatus according to an embodiment of this application.

FIG. 12 shows a communication apparatus according to an embodiment of this application. The communication apparatus may be configured to implement, for example, a function of the UE 1 in FIG. 5 or a function of the UE 1 in FIG. 6. The apparatus may alternatively be configured to implement, for example, a function of the UE 2 in FIG. 5. The apparatus may alternatively be configured to implement, for example, a function of the UE 2 in FIG. 6. In this embodiment of this application, the communication apparatus may be divided into functional units based on the foregoing method embodiment. For example, each functional unit may be obtained through division based on each corresponding function, or two or more units may be integrated into one processing module. The integrated unit may be implemented in a form of hardware, or may be implemented in a form of a software function module. It should be noted that the unit division in this embodiment of this application is an example, and is merely logical function division, or may be other division during actual implementation.

FIG. 12 is a schematic diagram of a structure of a communication apparatus 1200 according to an embodiment of this application. The communication apparatus 1200 includes a processing unit 1201 and a transceiver unit 1202.

The communication apparatus 1200 shown in FIG. 12 may be configured to implement, for example, the function of the UE 1 in FIG. 5 or the function of the UE 1 in FIG. 6.

Optionally, the processing unit 1201 is specifically configured to implement the function of performing configuration based on the configuration information of the SLRB in S303 and S405.

Optionally, the transceiver unit 1202 is specifically configured to implement the function of receiving the request message in S301 and S401.

Optionally, the transceiver unit 1202 is specifically configured to implement the function of sending the capability information of the UE 1 in S302 and S402.

Optionally, the transceiver unit 1202 is specifically configured to implement the function of receiving the configuration information of the SLRB in S303 and S405.

The communication apparatus 1200 shown in FIG. 12 may be configured to implement, for example, the function of the UE 2 in FIG. 5 or the function of the UE 2 in FIG. 6.

Optionally, the processing unit 1201 is specifically configured to implement the function of determining the configuration of the SLRB in S303.

Optionally, the transceiver unit 1202 is specifically configured to implement the function of sending the request information in S301 and S401.

Optionally, the transceiver unit 1202 is specifically configured to implement the function of receiving the capability information of the UE 1 in S302 and S402. Optionally, the transceiver unit 1202 is specifically configured to implement the function of sending the capability information of the UE 1 and the capability information of the UE 2 in S403.

Optionally, the transceiver unit 1202 is specifically configured to implement the function of receiving the configuration information of the SLRB in S404.

Optionally, the transceiver unit 1202 is specifically configured to implement the function of sending the configuration information of the SLRB in S303 and S405.

Specifically, the processor in the communication apparatus shown in FIG. 10 may invoke the computer-executable instructions stored in the memory, to implement a function/an implementation process of the transceiver unit 1202 and the processing unit 1201 in FIG. 12. Alternatively, a function/an implementation process of the processing unit 1201 in FIG. 12 may be implemented by the processor in the communication apparatus shown in FIG. 10 by invoking the computer-executable instructions stored in the memory, and a function/an implementation process of the transceiver unit 1202 in FIG. 12 may be implemented through the communication interface in the communication apparatus shown in FIG. 10.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In this embodiment of this application, the computer may include the apparatuses described above.

A person of ordinary skill in the art may be aware that, in combination with the examples described in embodiments disclosed in this specification, units and algorithm steps may be implemented by electronic hardware or a combination of computer software and electronic hardware. Whether the functions are executed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of multiple. A single processor or another unit may implement several functions enumerated in the claims. The fact that certain measures are recited in mutually different dependent claims does not indicate that a combination of these measures cannot bring better effects.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as covering any or all of modifications, variations, combinations, or equivalents within the scope of this application. Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A communication method applied to a first access network device, the method comprising:
    obtaining, from a terminal, capability information of the terminal, wherein the capability information indicates a first quantity, the first quantity is of first function objects supported by the terminal, the first function objects supported by the terminal are data radio bearers (DRBs) to which a respective first function is applied or a context maintained for the respective first function, and each respective first function is a data frame compression function, a packet data convergence protocol (PDCP) replication function, or an Ethernet header compression (EHC) operation function;
    determining a second quantity based on the capability information, wherein the second quantity is of first function objects that a second access network device is enabled to configure for the terminal, and the second quantity is less than or equal to the first quantity; and
    sending second information to the second access network device, wherein the second information indicates the second quantity.

2. The method according to claim 1, wherein the first quantity of first function objects supported by the terminal is a maximum quantity of first function objects supported by the terminal.

3. The method according to claim 1, wherein the second quantity of first function objects that the second access network device is enabled to configure for the terminal is:
    a maximum quantity of first function objects that the second access network device is enabled to configure for the terminal; or
    a quantity of first function objects to be configured by the second access network device for the terminal.

4. The method according to claim 1, wherein sending the second information to the second access network device comprises:
    sending a secondary station addition request message to the second access network device, wherein the secondary station addition request message comprises the second information; or
    sending a secondary station modification request message to the second access network device, wherein the secondary station modification request message comprises the second information.

5. A communication method applied to a second access network device, the method comprising:
    receiving first information from a first access network device, wherein the first information indicates a first quantity, the first quantity is of first function objects that the second access network device is enabled to configure for a terminal, the first function objects are data radio bearers (DRBs) to which a respective first function is applied or a context maintained for the respective first function, and the respective first function is a data frame compression function, a packet data convergence protocol (PDCP) replication function, or an Ethernet header compression (EHC) operation function, and the first information is based on capability information of the terminal that is obtained from the terminal; and
    sending configuration information to the terminal in response to receiving the first information, wherein the configuration information is used to configure the first function objects or a quantity of the first function objects, and the quantity of the first function objects that is configured by using the configuration information is less than or equal to the first quantity.

6. The method according to claim 5, wherein the first quantity of first function objects that the second access network device is enabled to configure for the terminal is:
    a maximum quantity of first function objects that the second access network device is enabled to configure for the terminal; or a quantity of first function objects to be configured by the second access network device for the terminal.

7. The method according to claim 5, further comprising:
receiving second information from the first access network device, wherein the second information indicates a second quantity, and the second quantity is of first function objects supported by the terminal.

8. The method according to claim 5, wherein receiving the first information from the first access network device comprises:
receiving a secondary station addition request message from the first access network device, wherein the secondary station addition request message comprises the first information; or
receiving a secondary station modification request message from the first access network device, wherein the secondary station modification request message comprises the first information.

9. A communication apparatus, comprising:
a transceiver;
at least one processor; and
one or more memories coupled to the at least one processor and storing programming instructions for execution by the at least one processor, wherein execution of the programming instructions causes the communication apparatus to:
obtain capability information of a terminal, wherein the capability information indicates a first quantity, the first quantity is of first function objects supported by the terminal, the first function objects are data radio bearers (DRBs) to which a respective first function is applied or a context maintained for the respective first function, and each respective first function is a data frame compression function, a packet data convergence protocol (PDCP) replication function, or an Ethernet header compression (EHC) operation function;
determine a second quantity based on the capability information, wherein the second quantity is of first function objects that a second access network device is enabled to configure for the terminal, and the second quantity is less than or equal to the first quantity; and
send second information to the second access network device, wherein the second information indicates the second quantity.

10. The apparatus according to claim 9, wherein the first quantity of first function objects supported by the terminal is a maximum quantity of first function objects supported by the terminal.

11. The apparatus according to claim 9, wherein the second quantity of first function objects that the second access network device is enabled to configure for the terminal is:
a maximum quantity of first function objects that the second access network device is enabled to configure for the terminal.

12. The apparatus according to claim 9, wherein the second quantity of first function objects that the second access network device is enabled to configure for the terminal is:
a quantity of first function objects to be configured by the second access network device for the terminal.

13. The apparatus according to claim 9, wherein the programming instructions, when executed by the at least one processor, further cause the communication apparatus to:
send a secondary station addition request message to the second access network device, wherein the secondary station addition request message comprises the second information.

14. The apparatus according to claim 9, wherein the programming instructions, when executed by the at least one processor, further cause the communication apparatus to:
send a secondary station modification request message to the second access network device, wherein the secondary station modification request message comprises the second information.

15. A communication apparatus, comprising:
a transceiver;
at least one processor; and
one or more memories coupled to the at least one processor and storing programming instructions for execution by the at least one processor, wherein execution of the programming instructions causes the communication apparatus to:
receive first information from a first access network device, wherein the first information indicates a first quantity, the first quantity is of first function objects that a second access network device is enabled to configure for a terminal, the first function objects are data radio bearers (DRBs) to which a respective first function is applied or a context maintained for the respective first function, and the respective first function is a data frame compression function, a packet data convergence protocol (PDCP) replication function, or an Ethernet header compression (EHC) operation function, and the first information is based on capability information of the terminal that is obtained from the terminal; and
send configuration information to the terminal in response to receiving the first information, wherein the configuration information is used to configure the first function objects or a quantity of the first function objects, and the quantity of first function objects that is configured by using the configuration information is less than or equal to the first quantity.

16. The apparatus according to claim 15, wherein the first quantity of first function objects that the second access network device is enabled to configure for the terminal is:
a maximum quantity of first function objects that the second access network device is enabled to configure for the terminal.

17. The apparatus according to claim 15, wherein the first quantity of first function objects that the second access network device is enabled to configure for the terminal is:
a quantity of first function objects to be configured by the second access network device for the terminal.

18. The apparatus according to claim 15, wherein execution of the programming instructions further causes the communication apparatus to:
receive second information from the first access network device, wherein the second information indicates a second quantity, and the second quantity is of first function objects supported by the terminal.

19. The apparatus according to claim 15, wherein the programming instructions, when executed by the at least one processor, further cause the communication apparatus to:
receive a secondary station addition request message from the first access network device, wherein the secondary station addition request message comprises the first information.

20. The apparatus according to claim 15, wherein the programming instructions, when executed by the at least one processor, further cause the communication apparatus to:

receive a secondary station modification request message from the first access network device, wherein the secondary station modification request message comprises the first information.

\* \* \* \* \*